US009436705B2

(12) United States Patent
Shakib et al.

(10) Patent No.: US 9,436,705 B2
(45) Date of Patent: Sep. 6, 2016

(54) GRADING IMAGES AND VIDEO CLIPS

(71) Applicant: Google Technology Holdings LLC, Mountain View, CA (US)

(72) Inventors: Babak Robert Shakib, San Jose, CA (US); Yuriy Musatenko, Mountain View, CA (US); Oleksii Kasitskyi, San Jose, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 115 days.

(21) Appl. No.: 14/231,611

(22) Filed: Mar. 31, 2014

(65) Prior Publication Data

US 2015/0078680 A1   Mar. 19, 2015

Related U.S. Application Data

(60) Provisional application No. 61/878,864, filed on Sep. 17, 2013.

(51) Int. Cl.
| G06K 9/54 | (2006.01) |
| G06F 17/30 | (2006.01) |
| G11B 27/034 | (2006.01) |
| H04N 1/21 | (2006.01) |
| G06K 9/00 | (2006.01) |
| G11B 27/02 | (2006.01) |
| G11B 27/10 | (2006.01) |
| G06F 3/0484 | (2013.01) |
| G06T 11/60 | (2006.01) |
| G06F 3/0488 | (2013.01) |

(52) U.S. Cl.
CPC ....... *G06F 17/30256* (2013.01); *G06F 3/0488* (2013.01); *G06F 3/04842* (2013.01); *G06F 3/04845* (2013.01); *G06F 17/30784* (2013.01); *G06K 9/00288* (2013.01); *G06T 11/60* (2013.01); *G11B 27/02* (2013.01); *G11B 27/034* (2013.01); *G11B 27/10* (2013.01); *H04N 1/212* (2013.01); *G06F 3/04847* (2013.01); *G06T 2200/24* (2013.01); *G06T 2200/32* (2013.01)

(58) Field of Classification Search
CPC .............. G06F 17/30256; G06F 17/30784; G06K 9/00288; G06K 9/00684; G06K 9/00677; G06K 9/4676; G06K 9/72; H04L 67/22; G06Q 50/01; G06Q 30/0271
USPC ........................................................ 382/305
See application file for complete search history.

(56) References Cited

U.S. PATENT DOCUMENTS

| 9,189,137 | B2 | 11/2015 | Boiman et al. |
| 2006/0156243 | A1 | 7/2006 | Lee et al. |
| 2008/0091635 | A1 | 4/2008 | James et al. |
| 2008/0154931 | A1* | 6/2008 | Jacobs et al. ............... 707/101 |
| 2009/0087037 | A1 | 4/2009 | Wada |
| 2011/0032429 | A1 | 2/2011 | Bing |

(Continued)

OTHER PUBLICATIONS

"Dogfooding: Highlight Reel in Gallery", 11 pages.

(Continued)

*Primary Examiner* — Ali Bayat
(74) *Attorney, Agent, or Firm* — Wolfe-SBMC

(57) ABSTRACT

Techniques apparatuses for grading images and video clips are described. These techniques and apparatuses enable highlights of these graded images and video clips to be more-quickly created, at a high quality, or using fewer resources.

20 Claims, 17 Drawing Sheets

(56) References Cited

U.S. PATENT DOCUMENTS

| | | | |
|---|---|---|---|
| 2011/0183651 A1 | 7/2011 | Mundy et al. | |
| 2012/0063736 A1 | 3/2012 | Simmons et al. | |
| 2012/0096357 A1 | 4/2012 | Folgner et al. | |
| 2012/0189284 A1 | 7/2012 | Morrison et al. | |
| 2012/0219271 A1 | 8/2012 | Vunic et al. | |
| 2013/0051756 A1 | 2/2013 | Chao et al. | |
| 2013/0077835 A1 | 3/2013 | Kritt et al. | |
| 2013/0142418 A1 | 6/2013 | van Zwol et al. | |
| 2013/0195422 A1 | 8/2013 | Patil et al. | |
| 2013/0212094 A1* | 8/2013 | Naguib et al. | 707/730 |
| 2014/0002644 A1* | 1/2014 | Fedorovskaya et al. | 348/143 |
| 2015/0019523 A1 | 1/2015 | Lior et al. | |
| 2015/0078726 A1 | 3/2015 | Shakib et al. | |
| 2015/0078732 A1 | 3/2015 | Shakib et al. | |
| 2015/0082172 A1 | 3/2015 | Shakib et al. | |
| 2015/0309844 A1 | 10/2015 | Lowe et al. | |

OTHER PUBLICATIONS

"Animoto—Home", retrieved from <http://animoto.com/> on Aug. 26, 2013, 5 pages.

"Animoto—Features", retrieved from <http://animoto.com/features> on Aug. 26, 2013, 6 pages.

"Magisto—How It Works", retrieved from <http://www.magisto.com/how-it-works> on Aug. 26, 2013, 7 pages.

Mossberg, "Creating and Sharing Videos that are Not Too Long and Not Too Short", Wall Street Journal, retrieved from <http://online.wsj.com/article/SB10001424127887323936404578581651707015148.html> on Aug. 16, 2013, Jul. 2, 2013, 5 pages.

"Non-Final Office Action", U.S. Appl. No. 14/231,573, Jan. 14, 2016, 14 pages.

"Non-Final Office Action", U.S. Appl. No. 14/231,546, Nov. 4, 2015, 23 pages.

"Restriction Requirement", U.S. Appl. No. 14/231,573, Nov. 20, 2015, 8 pages.

Final Office Action, U.S. Appl. No. 14/231,573, May 6, 2016, 19 pages.

Final Office Action, U.S. Appl. No. 14/231,546, Apr. 8, 2016, 25 pages.

Non-Final Office Action, U.S. Appl. No. 14/231,644, Jun. 10, 2016, 25 pages.

* cited by examiner

GRADING IMAGES AND VIDEO CLIPS

This application claims the benefit of U.S. Provisional Application Ser. No. 61/878,864, filed Sep. 17, 2013, the contents of which are hereby incorporated herein by reference in their entirety.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Current techniques for creating photo slideshows enable users to select photographs, an order for those photographs, transition effects between each selected photograph, accompanying music, and an amount of time that each photograph is presented. These current techniques allow good flexibility for users through selecting which photos, where in the slideshow, time presented, music played, and so forth. Creating photo slideshows using these current techniques, however, rely on substantial input from the user. The user, to have a photo slideshow that is desirable to watch, often has to pour over dozens or even hundreds of photos, decide which ones to include, what order to present them, what transitions to present between each, time shown for each, and so forth. This can be time consuming and cumbersome for users even for fairly simple photo slideshows.

Using these current techniques can be even more time consuming and difficult if the user wishes to create a moderately complex photo slideshow. Assume, for example, that a mother of a kindergartener wishes to create a photo slideshow to present at the kindergarten classes' year-end party. If she wants to balance how many times each child in the kindergarten is shown—so that the photo slideshow is fair to the children—she may have to pour over hundreds of photos for that year, make sure she has at least two or three images for each child, while likely also wanting to show each child at multiple events from the year, and so forth. Even for these simple criteria—number of times shown and showing each child at more than one event—can take substantial time and effort using current techniques.

BRIEF DESCRIPTION OF THE DRAWINGS

Techniques and apparatuses for grading images and video clips are described with reference to the following drawings. The same numbers are used throughout the drawings to reference like features and components.

DETAILED DESCRIPTION

This document describes techniques that allow a user to quickly and easily generate a highlight reel. The techniques may do so in various manners, including through quick and easy selection and weighting of persons and contexts used to create a highlight reel. The techniques may also or instead create highlight reels based on when and where people appear in scenes within media, quality metrics, and contextual variety of media from which the highlight reel is sourced. The techniques also enable sharing of these highlight reels, in some cases automatically on creating the highlight reel, such as to persons known to be in the highlight reel.

The following discussion first describes an operating environment, followed by techniques that may be employed in this environment along with example user interfaces, and concludes with an example device.

Figure 1:
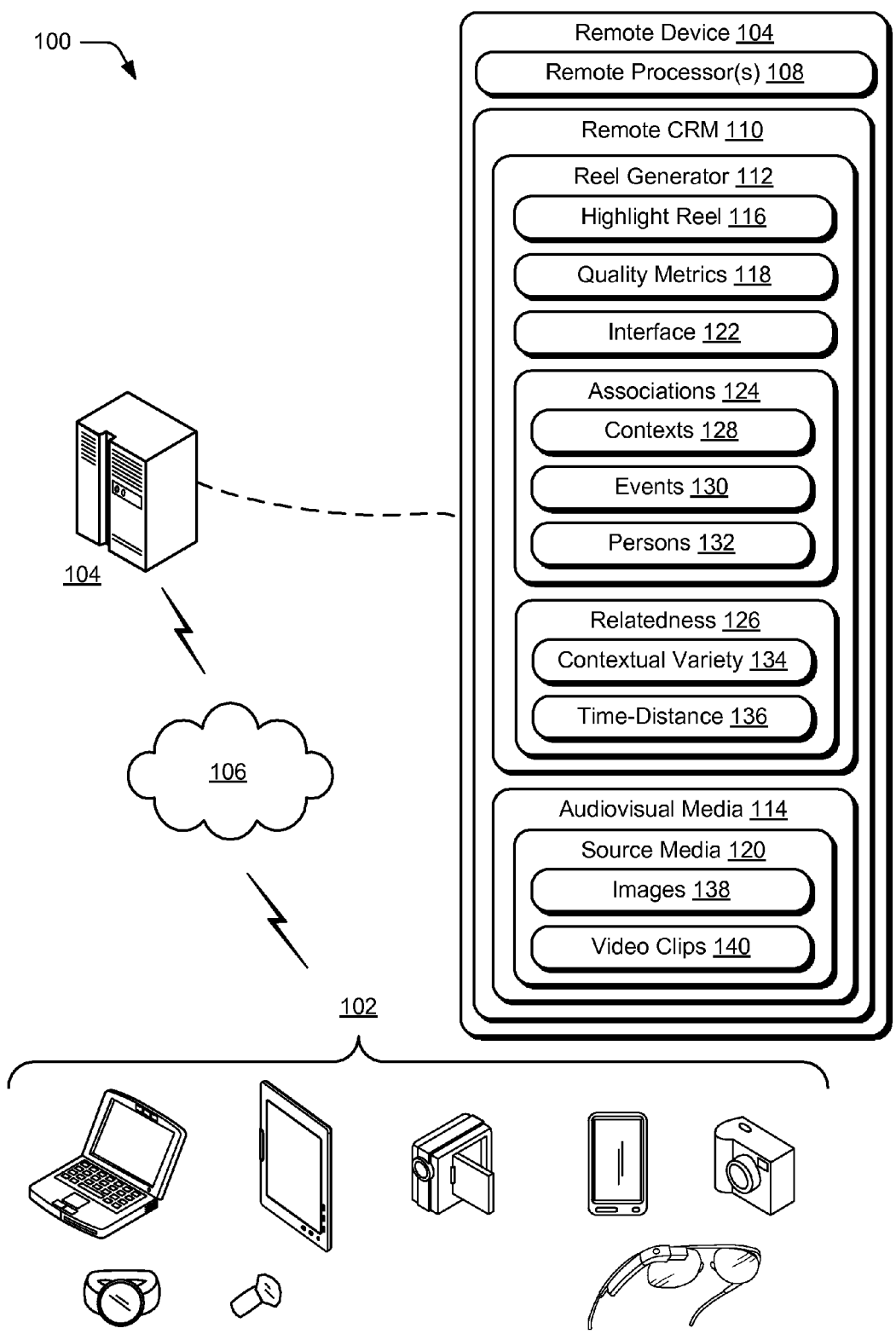
FIG. 1 illustrates an example environment in which techniques for grading images and video clips as well as other techniques described herein can be implemented.

FIG. 1 illustrates an example environment 100 in which techniques for grading images and video clips and other techniques related to highlight reels can be implemented. Environment 100 includes a computing device 102, a remote device 104, and a communications network 106. The techniques can be performed and the apparatuses embodied on one or a combination of the illustrated devices, such as on multiple computing devices, whether remote or local. Thus, a user's smart phone may capture (e.g., take photos or video) some of the media from which the highlight reel is generated, as well as receive other media from other devices, such as media previously uploaded by a friend from his or her laptop to remote device 104, directly from another friend's camera through near-field communication, on physical media (e.g., a DVD or Blu-ray™ disk), and so forth. Whether from many or only one source, the techniques are capable of creating a highlight reel at any of these devices.

In more detail, remote device 104 of FIG. 1 includes or has access to one or more remote processors 108 and remote computer-readable storage media ("CRM") 110. Remote CRM 110 includes reel generator 112 and audiovisual media 114. Reel generator 112 generates a highlight reel 116 based on one or more quality metrics 118 and using source media 120. More specifically, reel generator 112 receives a selection, or some information by which to make a selection, of source media 120 from audiovisual media 114. With this source media 120, reel generator 112 generates highlight reel 116, which may be generated based on user-selected or unselected quality metrics.

Quality metrics 118 include many different measures of an image or image portion's quality, as well as audio and video quality, such as single frames in video or video subclips. Some quality metrics are independent metrics, and thus values given for an image being analyzed are not based on values given for other images, such as image brightness and eye blinks. Other quality metrics are relative metrics based at least in part on a quality metric value given to another image, such as uniqueness. Example quality metrics 118 include, for example: brightness, color variance, overall sharpness, accumulated-faces area, head orientation, face or faces smiling, eye blinks, locations of one or more faces within the image or frame, eye focal point, aspect ratio of the image or frame, uniqueness, mistakes, and face blur.

Reel generator 112 also includes or has access to an interface 122. Interface 122 enables quick and easy selection of various people, contexts, events, and so forth as described below. In some cases, interface 122 enables simple and intuitive selection to weight persons, contexts, and events such that a user is able to tailor or adjust a highlight reel to his or her preferences.

Reel generator 112 further includes or has access to associations 124 and relatedness 126. Both associations 124 and relatedness 126 can be used by reel generator 112 to determine which images and subclips to use to create a highlight reel.

Associations 124 includes one or more of contexts 128, events 130, and persons 132. Images and video clips include scenes that have one or more contexts 128. Contexts 128 include scenes, such as indoor, outdoor, of particular seasons (autumn, summer), nighttime, daytime, work, and home, though they may also be more specific, e.g., in a mall, at dinner, of a picnic, on a boat or plane, identified with particular items (fishing pole, soccer ball, baseball bat, Frisbee, people wearing shorts, skirt, helmet, or tie), and so forth. Contexts 128 can also be based on when or where media was captured, such as at breakfast time, naptime, weekends, sports field (e.g., kids soccer field or professional rugby stadium), while the capture device was moving rapidly (e.g., in a car), and so forth. Context 128 also includes association with particular events, such as images and video clips taken at a concert (based on location or a person's capture device where the person's calendar indicates they will be at the concert) or saved in an album selected to organize media, such as media taken during a particular vacation. Events 130, which are considered a type of context 128 in some cases, are events associated with the image or clip, such as a time, location, or theme at which media is captured. Events 130 may include calendar events or based on location (e.g., the soccer field or concert above).

Assume for example that two friends meet at a park for a picnic. The picnic can be an event associated with media captured during the picnic while the park can have numerous contexts for the media, such as outdoors, sunny, windy, people eating, and so forth. Associations also include persons 132, which include people in the media or associated in some way with the media, such as a person that is in the media or that, while not recognized or tagged for an image, is at a shared calendar event at which the image was captured.

Relatedness 126 includes contextual variety 134 and time-distance 136. In creating a highlight reel, reel generator 112 may select images and subclips from source media 120 based on values given for contextual variety 134 and time-distance 136. Assume, for example, that various high-quality images (measured by quality metric values) indicate that six video subclips are of high quality. Assume further that reel generator 112 is deciding on which four to include (e.g., to keep the highlight reel from being too long). One measure of what to keep is to value variety—thus if five of the subclips are outdoors (and thus have low contextual variety with each other), they are of lower value than the high-variety single indoor subclip. Also, subclips further away from each other in time taken are of higher value. If three of the subclips are taken within 10 minutes of each other and the other three are taken days apart, the three taken within 10 minutes are given a lower value for use in a highlight reel as being too related to each other.

As noted in part above, the techniques may generate highlight reel 116 automatically and with little or no explicit selection of what images or which persons to include. The techniques may, however, enable selection of quality metrics and weights of persons and contexts. Thus, a user may select to highlight Bella and Ann, at which time reel generator 112 determines source media 120 of audiovisual media 114 that has Bella or Ann or includes content associated with either or both of them, e.g., photos and video captured at a concert that both Bella and Ann attended. Time-consuming and explicit selection of particular images and so forth, however, can be avoided by the user. In cases where the user wants more control, the techniques enable selections but in a quick and easy-to-use manner.

Audiovisual media 114 includes available media from which to source a highlight reel. Audiovisual media 114 may include photos, videos (which may include audio), and music, or portions thereof. As will be described below, a subset of available media can be selected as source media 120 for a highlight reel, though this source media 120 can be drawn or received from many sources as noted above. Source media 120 includes images 138 and video clips 140 though both are not required for creation of highlight reel 116. Note that source media 120 can include a previously created highlight reel, which in some cases can aid in creating a new highlight reel more quickly or with fewer computing resources. Media in a previously created highlight reel may include media not separately within source media 120. Multiple users may share their highlight reels of a same event for creation of an overarching highlight reel based on the prior highlight reels, for example.

Images 138 can be captured images, e.g., photographs, or portions thereof, such as 60 percent of an image cropped to fit a desired aspect ratio or remove undesirable elements, such as a finger obscuring part of an otherwise high-quality image. Video clips 140 are videos, which are generally captured and include audio, though this is not required. Subclips and images from single frames can be selected from video clips 140, which is described in detail below.

Figure 2:
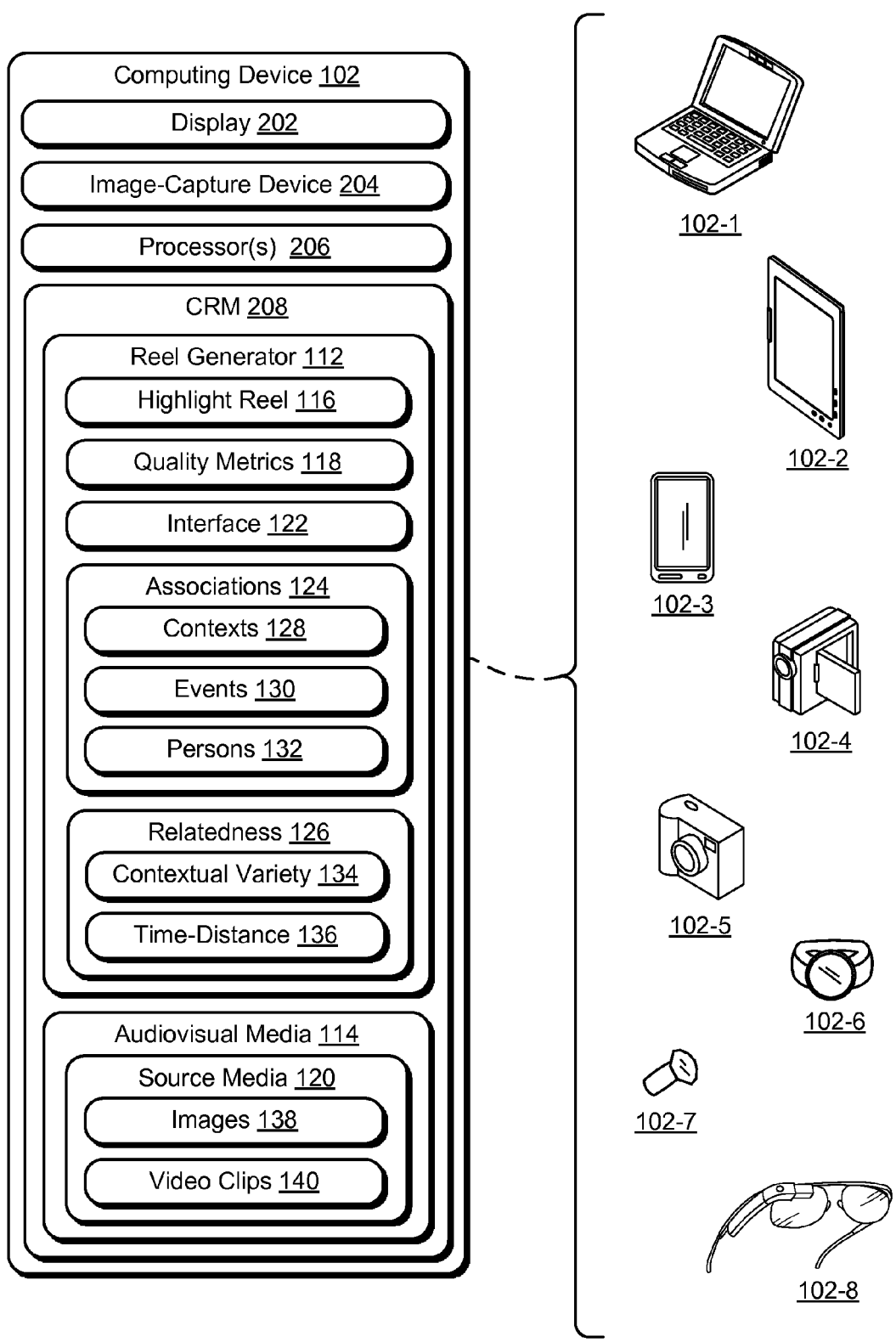
FIG. 2 illustrates a detailed example of a computing device shown in FIG. 1.

With regard to the example computing device 102 of FIG. 1, consider a detailed illustration in FIG. 2. Computing device 102 can each be one or a combination of various devices, here illustrated with eight examples: a laptop computer 102-1, a tablet computer 102-2, a smartphone 102-3, a video camera 102-4, a camera 102-5, a computing watch 102-6, a computing ring 102-7, and computing spectacles 102-8, though other computing devices and systems, such as televisions, desktop computers, netbooks, and cellular phones, may also be used. As will be noted in greater detail below, in some embodiments the techniques operate through remote device 104. In such cases, computing device 102 may forgo performing some of the computing operations relating to the techniques, and thus need not be capable of advanced computing operations.

Computing device 102 includes or is able to communicate with a display 202 (eight are shown in FIG. 2), an image-capture device 204, one or more processors 206, and computer-readable storage media 208 (CRM 208). CRM 208 includes reel generator 112, audiovisual media 114, highlight reel 116 (after generation, unless included in source media 120), quality metrics 118, source media 120, and interface 122. Thus, the techniques can be performed on computing device 102 with or without aid from remote device 104.

These and other capabilities, as well as ways in which entities of FIGS. 1 and 2 act and interact, are set forth in greater detail below. These entities may be further divided, combined, and so on. The environment 100 of FIG. 1 and the detailed illustration of FIG. 2 illustrate some of many possible environments capable of employing the described techniques.

Example Methods for Grading Images and Video Clips

To help enable fast creation of high-quality highlight reels, as well as save high-demand computing and power resources, the techniques may grade images and video clips prior to receiving a selection to build a highlight reel. This grading can include those set forth above, such as determining image quality, as well as determining associated events, contexts, and people. Grading of images and video clips can be performed at downtimes, immediately responsive to the media being captured, or when a capturing device is not on battery power. Whenever performed, grading of media prior to selection to create a highlight reel can enable faster creation or higher-quality highlight reels.

Figure 3:
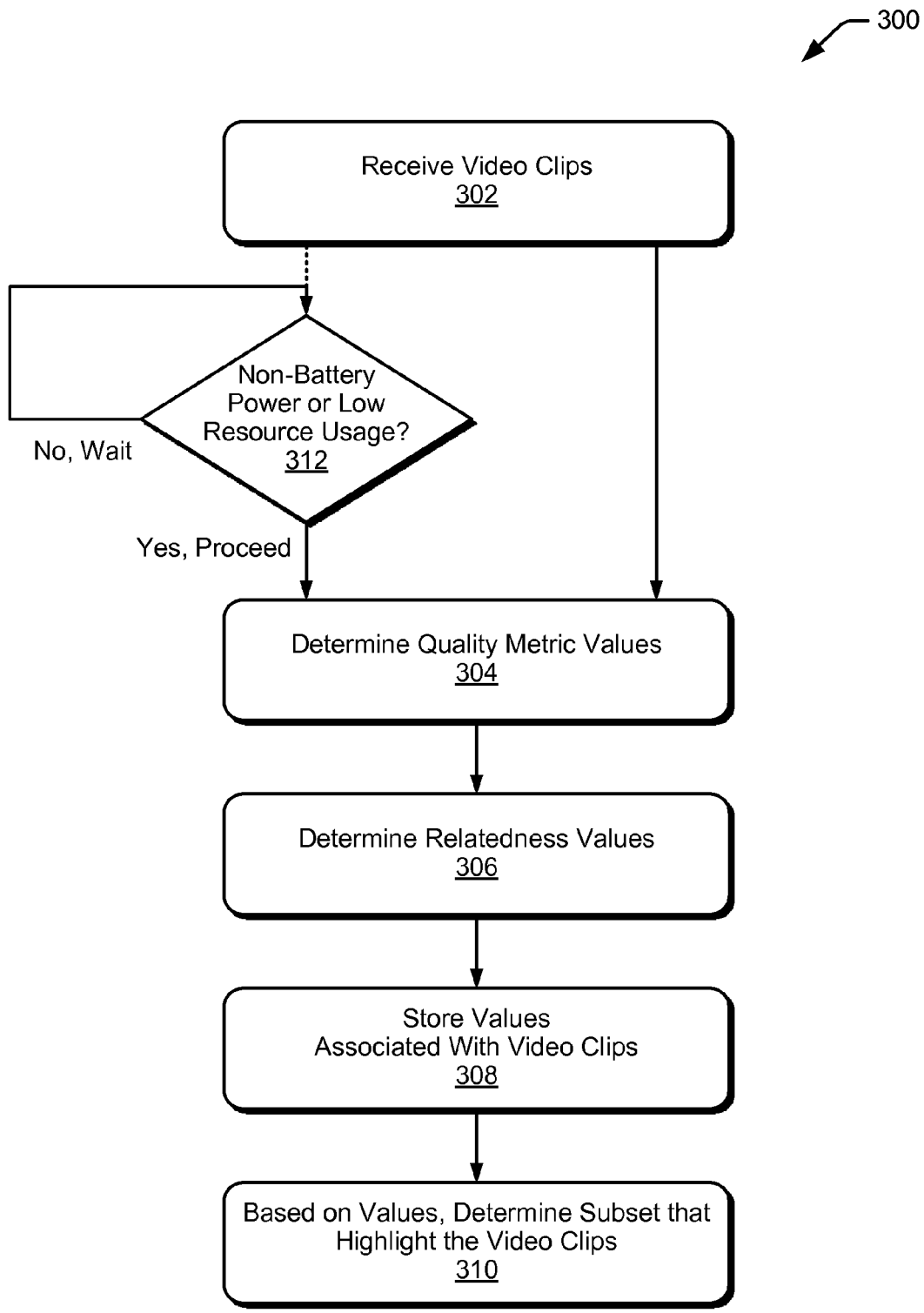
FIG. 3 illustrates example methods for grading video clips.

FIG. 3 illustrates example methods 300 for grading video clips. The order in which these and all other methods described here are presented is not intended to be construed as a limitation, and any number or combination of the described methods' operations can be combined in various orders to implement a method, or an alternate method, as well as in combination with, in whole or in part, other methods described herein.

At 302, video clips are received. As noted in part above, this example of source media can be received from one or multiple sources. Thus, the videos used can be captured by a device that performs the method or from another device and received at the device that performs the method (e.g., captured by camera 102-5 and received by remote device 104). Videos may instead be captured by numerous devices, such as by various persons at an event and shared for one or a collection of the devices to generate a highlight reel.

At 304, quality metric values for video clips are determined by grading the video clips and subclips of the video clips. As noted in part above, these quality metric values are determined based on various different quality metrics 118. In some cases the quality metric values are determined based on a frame-by-frame analysis, though this is not required. Quality metric values can be calculated based on an average per-frame quality for frames in each of the video clips. Other manners can instead be used, however, such as motion and facial tracking to determine relevant subclips with which to further analyze for quality.

In more detail, reel generator 112 can determine values for the various quality metrics as floating points, and these values can be associated with a positive or negative for inclusion in a highlight reel. Consider, for example, the following metrics, values given, and use of these values.

Image brightness can be calculated as an average value of a Y channel over all pixels of a downscaled frame. The resulting value is normalized to [0; 1], with brighter images (frames or a portion thereof) optionally being considered better.

Image color variance can be calculated by determining the standard deviation of each of the R (red), G (green), and B (blue) channels, and averaging these values. The resulting value is normalized to [0; 1], with bigger color variance optionally considered better.

Overall image sharpness can be determined in various image-analysis manners known and given a value in the [0; 1] range, though it may be normalized, with higher sharpness considered better.

Accumulated faces area can be calculated by determining a number of faces and dividing that number by the image area of the faces. The resulting value is normalized to [0; 1] with more faces considered better and larger faces considered better (in some cases, though face-size variance can also be desired); several large faces may be considered better than many small faces, depending on the user's selection and/or display size on which the highlight reel is intended to be presented (e.g., large screen display or smart phone display).

Head orientation can be determined to be either a frontal face or a profile face. Centered faces are optionally considered to be better. A frontal face is centered if it is lying in the middle third on the horizontal axis and a profile face is considered to be centered if it is lying in the left or right thirds and is facing toward the center of the frame.

Faces smiling can be determined based on whether or not faces are smiling, with the rates being normalized to [0; 1] with smiling faces optionally considered better. Eye blinks can be determined based on whether or not faces in an image are blinking, and the rates are normalized to [0; 1] with blinks on faces considered worse.

Location of a face or faces in the image can be determined based on facial recognition providing a center, box, or eye location, and measuring that location relative to borders of the image. Values can be used to measure this, such as with a face at a bottom corner having a relative low value in the [0; 1] range. Location issues can, in some cases, be addressed by cropping and expanding the image, though this may reduce resolution and context.

Aspect ratio can be measured and given a value, again with values in the [0; 1] range. Some aspect ratios are less desired, especially in cases where a highlight reel is desired to be shown with a particular aspect ratio that does not match the aspect ratio of the image. Thus, for a highlight reel selected for 16:9, an image having an aspect ratio of 4:3 may be less desirable. For many mobile devices, the aspect ratio selected for the highlight reel may be 9:16 or some other taller-than-it-is-wide aspect. The techniques may also take this into account.

Uniqueness can be determined based on similarity with other images being used to build the highlight reel, with values in the [0; 1] range. Thus, an image having the same three people smiling directly into a camera (even if they are dressed differently, etc.) may be given a lesser value. The techniques, by so doing, can provide a highlight reel with variety and that emphasizes differences. A lack of uniqueness, however, can be addressed in some cases by reducing a display time for and/or bunching together these similar images. Thus, for three images having the same two people both looking directly at the camera and smiling, the techniques may choose to show all three in rapid succession.

Mistakes, such as images not intended to be taken, or with a finger or some other obstruction, can be determined and given a value in the [0; 1] range. In some cases an image taken by mistake is determined through other manners, such as blurriness, lack of faces, and so forth as well. Images that are nearly all black or white or with little contrast, for example, can be given lesser values or excluded completely.

Face blur can be determined based on the blurriness of faces in an image, with values in the [0; 1] range. Images with blurry faces are optionally considered worse, though in some cases movement of faces in video can be considered desirable, which may be indicated by multiple blurry images over multiple frames.

At 306, relatedness values are determined between the various video clips. These relatedness values can be for some, rather than all, of the various video clips. Further, those of the various video clips for which relatedness is determined can be based on those of the various video clips determined to be higher-quality video clips. As noted above, relatedness 126 includes contextual variety 134 and time-distance 136. These are but two ways in which to measure how closely related clips and subclips are to each other. Relatedness can be used in determining a highlight reel by valuing variety (or lack thereof).

By way of example, consider two subclips of a video clip that are close together within a media timeline of that video clip (e.g., in chronological proximity). These subclips are generally considered less valuable than subclips that are more distant in the timeline. Thus, time-distance 136 measures this value based on their relatedness. Another example of relatedness is subclips from a same album when source media 120 includes multiple albums. As variety is generally considered more valuable than homogeneity, a time distance penalty can be assessed for subclips from the same album. This is not the case, however, when source media 120 is from only one album or event.

At 308, the quality metric values and the relatedness values for the video clips are stored. These values are effective to enable reel generator 112 to determine a subset of the video clips or subclips of the video clips that highlight the video clips (e.g., with a highlight reel). Note that these subclips can be portions of the video clips or those of the video clips determined to be of higher quality and that are less related, for example. Thus, twenty video clips can be graded for quality, fifteen that are of higher quality can be analyzed for relatedness, and subclips of nine of those fifteen that are less related can be used to highlight the video clips.

At 310, a subset highlighting the video clips is determined based upon the stored values. This subset, as noted herein, can include subclips of one or more of these video clips. In this particular example, reel generator 112 determined subclips for use in highlight reel 116 based on quality metric values and relatedness values for various video clips. This is not intended to be limiting to just video clips, however, as images may also be used as source media 120. Generating highlight reels is set forth in substantial detail below and so is not detailed here.

Optionally, at 312, the techniques may wait to proceed to operations 304 and 306 until a computing device on which methods 300 are being performed is determined to be on non-battery power or in a state of low-resource usage at 312. Thus, when resources, such as processing resources, are in demand reel generator 112 may forgo using these processing resources. As methods 300 require power, reel generator 112 may wait until the computing device is no longer on battery power.

In addition to determining quality metric values and relatedness values as part of methods 300, the techniques may also recognize persons in the video clips and store identifiers for recognized persons effective to enable later creation of a highlight reel with little or no facial recognition required at that later time.

Note that reel generator 112 may determine that, based on quality metric values and in some cases relatedness values, some video clips for portions of the clips should be excluded from consideration for use in a highlight reel. Similarly, reel generator 112 may determine that certain portions of the video clip should be candidates for use in the highlight reel, such as a small subclip, which is a portion of the video clip. By way of example, consider a video clip taken of an entire inning of a Little League baseball game. Assume that this video clip is 14 minutes long and includes substantial portions in which very little movement is recorded, portions that are obscured by a hand or arm, and are washed out by the capture device being pointed toward the sun. Reel generator 112, performing methods 300, may remove from consideration these portions of the video clip.

Figure 4:
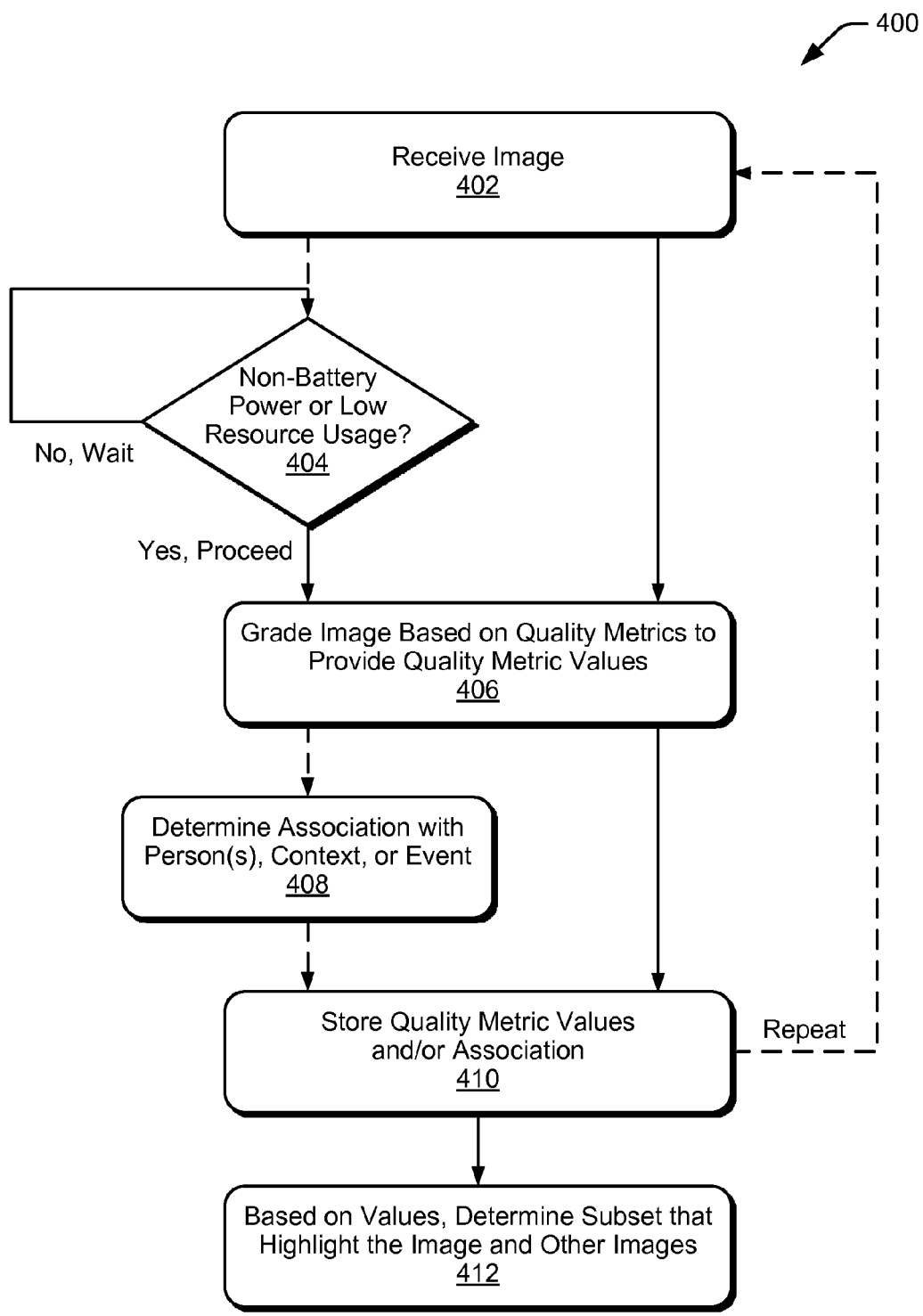
FIG. 4 illustrates example methods for grading images.

FIG. 4 illustrates example methods 400 for grading images. At 402, an image is received. This image can be one of the many described herein, such as images 138 of audiovisual media 114.

Methods 400 may proceed directly to operation 404 or 406. Reel generator 112, for example, may wait to perform future operations or proceed. At 404, if a computing device performing operations of methods 400 is on non-battery power or low resource usage, methods 400 proceed to operation 406 if not, methods 400 may wait.

At 406, images are graded based on quality metrics to provide quality metric values. As noted above, these quality metric values can be floating-point values for each image, though this is not required.

Optionally, methods 400 may proceed to operation 408 prior to operation 410. At 408, association of a received image is determined for various persons, contexts, or events. This can be as simple as performing facial recognition on an image to determine a person in the image. Other examples include determining that an image has a particular context or was taken during a particular event.

At 410, quality metric values and/or associations are stored. Similarly to methods 300, this enables reel generator 112 to more quickly or with higher quality generate a highlight reel responsive to selection to do so. Operations of methods 400 may be repeated effective to continue to grade images, shown at a dashed repeat line in FIG. 4.

At 412, a subset that highlights the image and other images is determined based on these values. This subset can be a portion used to create a highlight reel or represent the highlight reel described below.

In some cases battery power and resource usage is less important because methods 300 and 400 are performed at least in part by remote device 104. In such a case, images are received from one or more computing devices 102 over communication network 106 and by remote device 104. In such a case, transmission bandwidth and transmission resources can instead be factors, but these factors affect the methods prior to receiving the video clips or images. Thus, the techniques may wait to transmit images and videos until these resources are available or the power cost to transmit is not drawn from a battery.

Example Methods for Creating Highlight Reels

With or without prior grading of media as noted in methods 300 and 400 above, the techniques are capable of creating highlight reels that highlight source media. This highlighting can be based on context, quality, and persons. This highlighting can be performed with little or no input from users. In cases where a user desires more control, the techniques enable quick and easy selection of source media, persons, and context.

Figure 5:
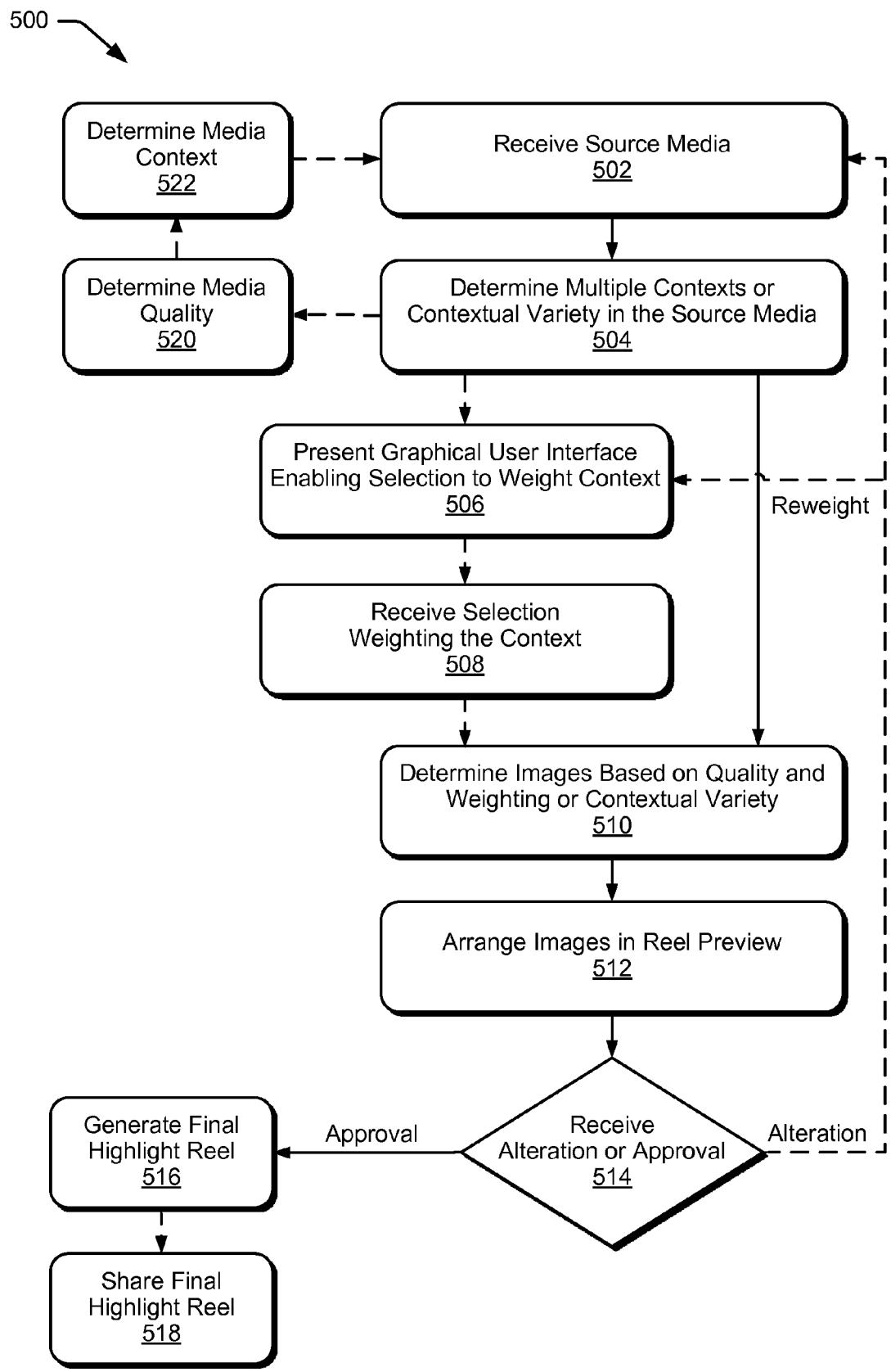
FIG. 5 illustrates example methods for creating and sharing highlight reels, in some cases including weighting of contexts in source media.

FIG. 5 illustrates example methods 500 for creating a highlight reel based on quality metrics and contextual variety or selected contextual weightings.

Figure 6:
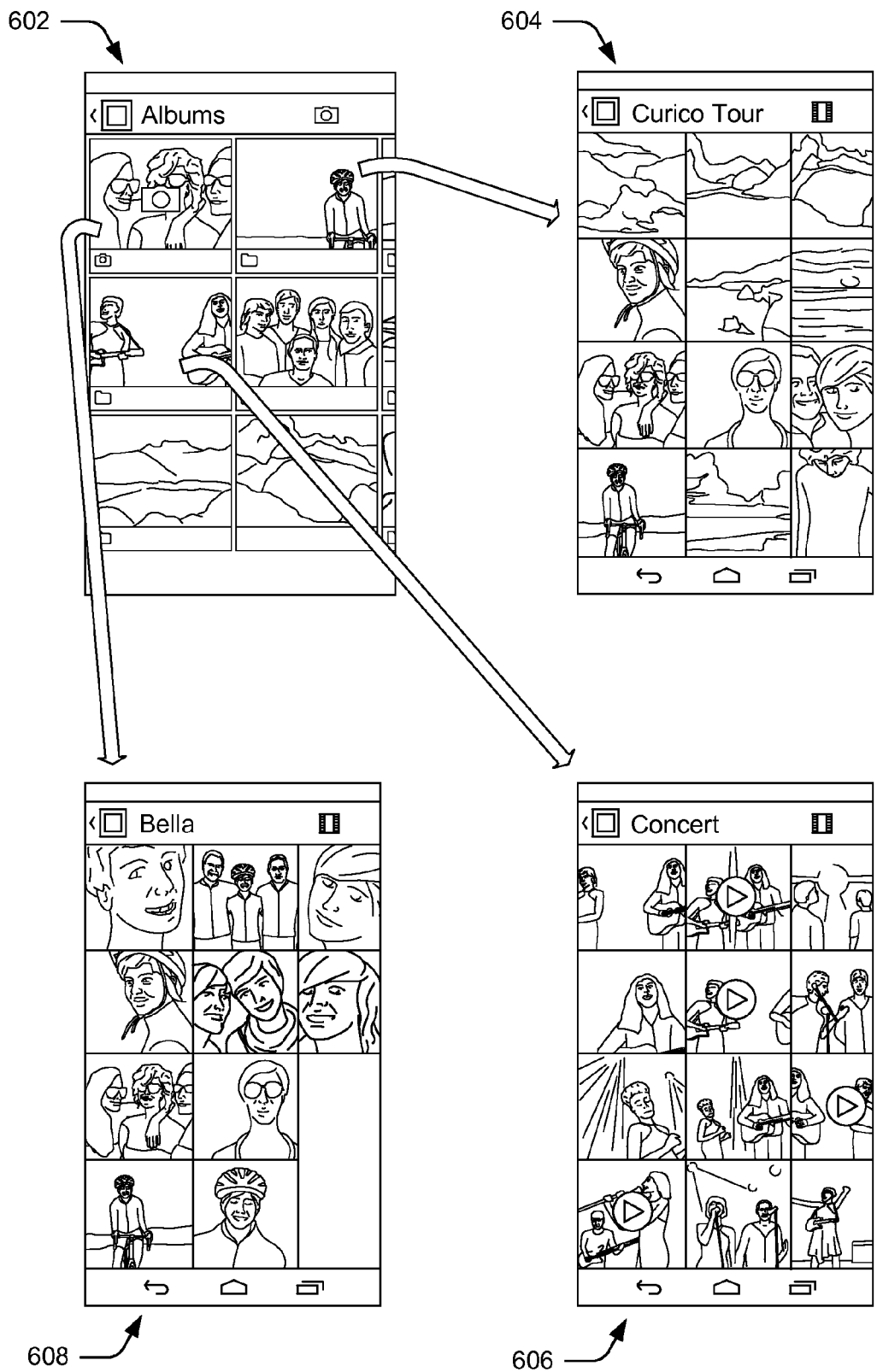
FIG. 6 illustrates an example interface enabling selection of source media through media albums.

At 502, source media is received. Receiving source media may include retrieving selected source media from remote sources or local memory. In some cases source media is selected to narrowly focus the created highlight reel. Also, source media can be selected in various manners, some of which are illustrated in FIG. 6. This source media can be selected prior to creation of the source media, in whole or in part. A user may select, for example, future media to be the source for the highlight reel. Examples include selection of an event that is currently occurring or is scheduled to occur later and thus images and video captured during that event to be used as the source media for the highlight reel. Source media may then be received automatically on completion of the event.

By way of example consider FIG. 6, which illustrates selection of source media through media albums. In this example, six media albums are illustrated in an album selection interface 602. Three of these media albums are further illustrated in their own user interfaces responsive to selection of a graphical album identifier within album selection interface 602. Of these three media albums, two are directed to events and one is directed to a particular person. In the first media album, illustrated at vacation album 604, media captured during a vacation bicycle touring the Curia) wine region of Chile, South America is organized into the album. In the second media album, illustrated at concert album 606, media captured during a concert is organized into the album. In the third media album, illustrated at person album 608, images and video clips that show Bella are organized. Thus, reel generator 112 may receive selection of source media through selection of an album or multiple albums.

By way of another example, consider a case where four friends have a calendar event where they are all going to the same party. They can select, or by default be selected, to agree to share media from that party. Assume that each of the friends take pictures, videos, and so forth. The techniques can determine when the event begins, such as by the scheduled time or by when each arrives (e.g., by physical proximity), and when the event ends (e.g., by calendar event ending) or by dispersing from the party (e.g., no longer in physical proximity). Source media is then determined to be media captured by devices associated with these four friends during the event, which is then shared sufficient for reel generator 112 to have access to the source media. On the event ending, each of the devices can, either due to a prompt received from a device generating the highlight reel, or on their own share the media.

At 504, contextual variety and/or multiple contexts for images and video clips within the source media are determined. Determining contextual variety can be based on previously determined contexts, or contexts can be determined as part of operation 504. In some cases as noted above, contextual similarity can be penalized so that greater contextual variety is shown in the highlight reel. In some cases, however, contextual variety is less desired, such as in cases where a particular album is selected for highlighting, or on selection of contexts desired by a user.

Note that further refinements on media to be used as source media, or criteria by which images are used in the highlight reel, may include source media that includes some number of the members of the group (e.g., two or more of the four friends). Ways in which the highlight reel is shared can be based on this selection, which is described in detail below.

This selection of source media can also or instead indicate the persons making the selection, such as the four friends going to the party. In such a case, reel generator 112 can determine that the media captured during the event by these devices includes images having these friends, which can aid or replace a need for facial recognition in some cases. The techniques may then forgo requiring selection (e.g., tagging) of image portions for faces that are not recognizable by facial recognition techniques. Instead, the techniques may simply assume that the images include the persons or are relevant to those persons that captured the media, and share a highlight reel using this source media on that basis.

At 506, reel generator 112, through interface 122, presents a graphical user interface enabling selection to weight contexts. The contexts can be presented at their expected weighting based on the contexts determined in source media 120 (e.g., the source media for the four friends from the party), or instead weightings can be presented evenly for selection.

Figure 7:
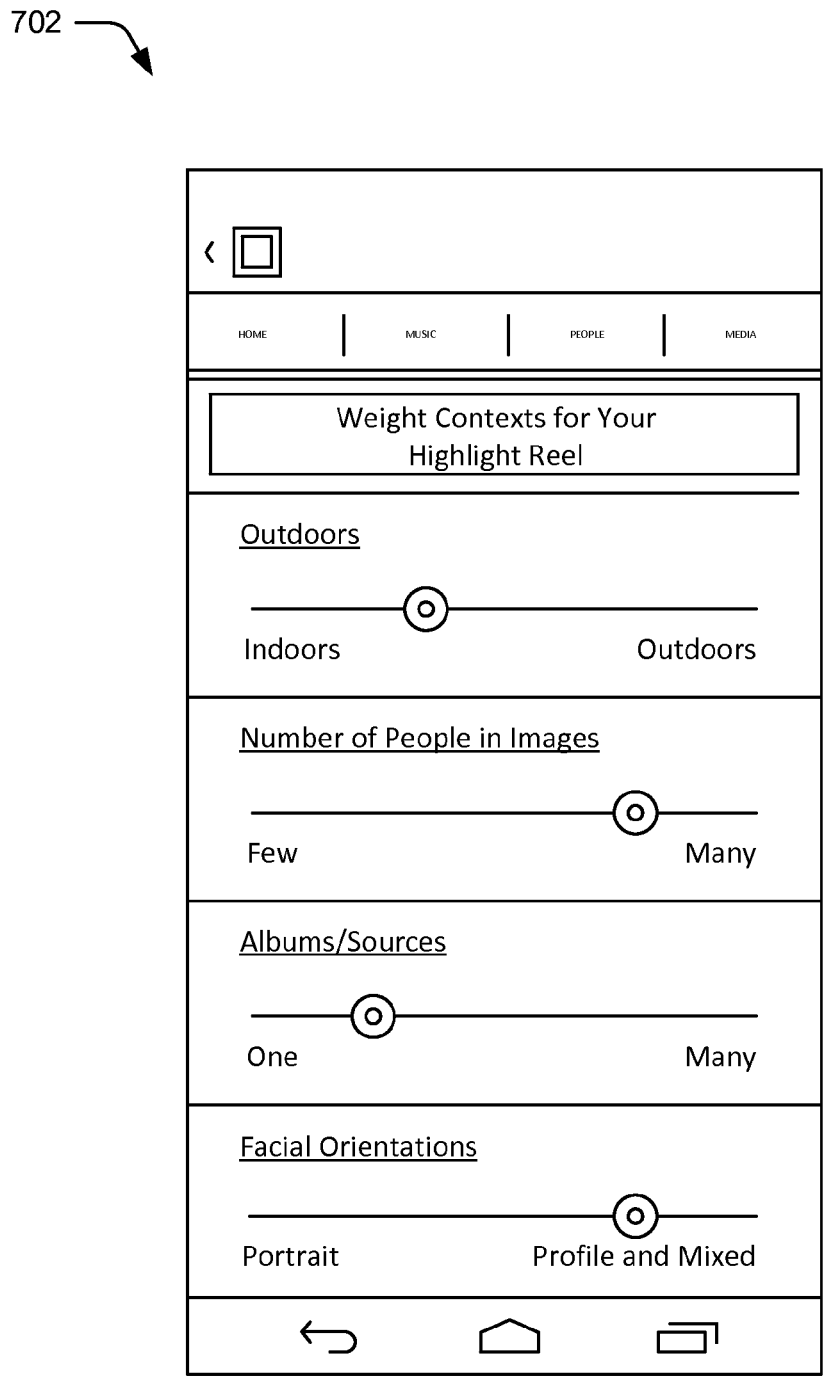
FIG. 7 illustrates an example interface presenting and enabling alteration of context weightings determined from source media.

By way of example, consider FIG. 7, which illustrates graphical context-weighting interface 702. Interface 702 presents contexts at weightings determined from source media 120. In this case current weightings have a relatively high weighting of indoor scenes, images with many persons in them, few albums/sources (here one album but four sources—from each of the four friends), and mixed facial orientations rather than predominantly portrait (face-forward) images.

At 508, selection to weight one or more of the contexts is received. These weightings can be altered quickly and easily by a user, such as to weight more to facial orientations having portraits or that include fewer persons shown in each image. Note that contextual weighting can be performed before source media is even selected, and thus be a criteria on which source media is determined. Contextual weightings can also be performed after source media is determined but before creation of a reel preview. Further still, weightings can be altered after presentation of a reel preview. Thus, selection to alter a weighting can alter a final highlight reel by altering source media or which subset of media is used to highlight the source media.

At 510, a subset of the images and video clips by which to highlight the source media is determined. This determination can be based on the contextual variety of the images in the video clips and quality metric values of the images and video clips. As noted above, it may further be based on selected weightings of contexts or persons.

Figure 8:
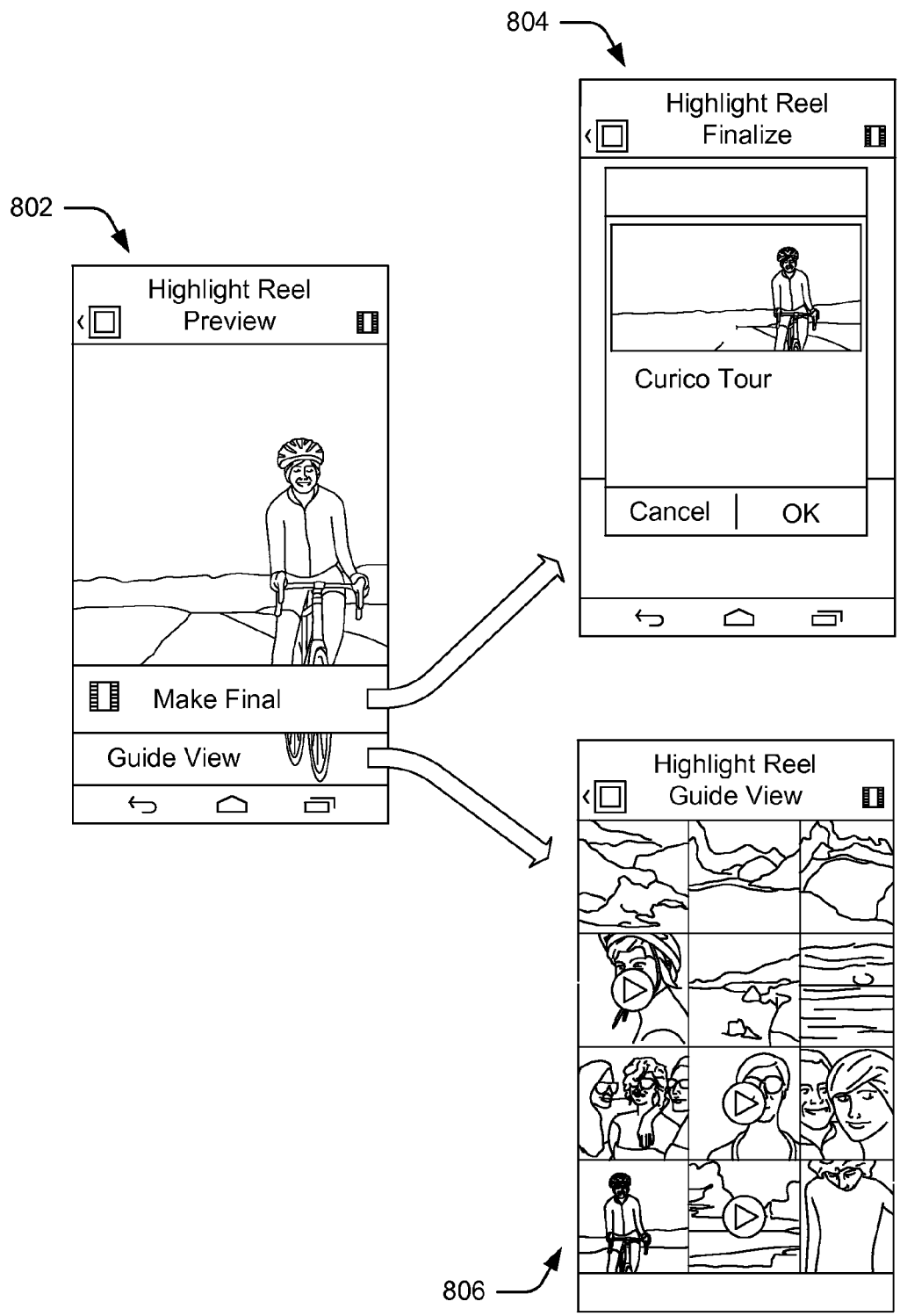
FIG. 8 illustrates an example reel preview interface.

At 512, the subset of the images and video clips are arranged into a reel preview. Reel generator 112 may present this reel preview and enable selection to alter or approve the reel preview. An example interface through which a reel preview can be viewed is shown in FIG. 8, at reel preview interface 802. The reel preview can be approved through final selection interface 804. Operation 512 may arrange images into a reel preview a similar manner to generating a final highlight reel. To reduce processing time and resources, however, reel generator 112 may present the preview without encoding the preview, and using sequential subclips of one or more of the video clips. These sequential subclips are presented by playing start and stop points within the respective one or more video clips rather than separate out or separately store the subclips.

At 514, a selection to alter or prove the reel preview is received. Returning to FIG. 8, through reel preview interface 802, a user may watch the preview and select to alter or approve the reel preview. If altered, methods 500 proceed along alteration path to perform one or more operations of methods 500 again. If approval is received, methods 500 proceed along approval path to operation 516.

Figure 9:
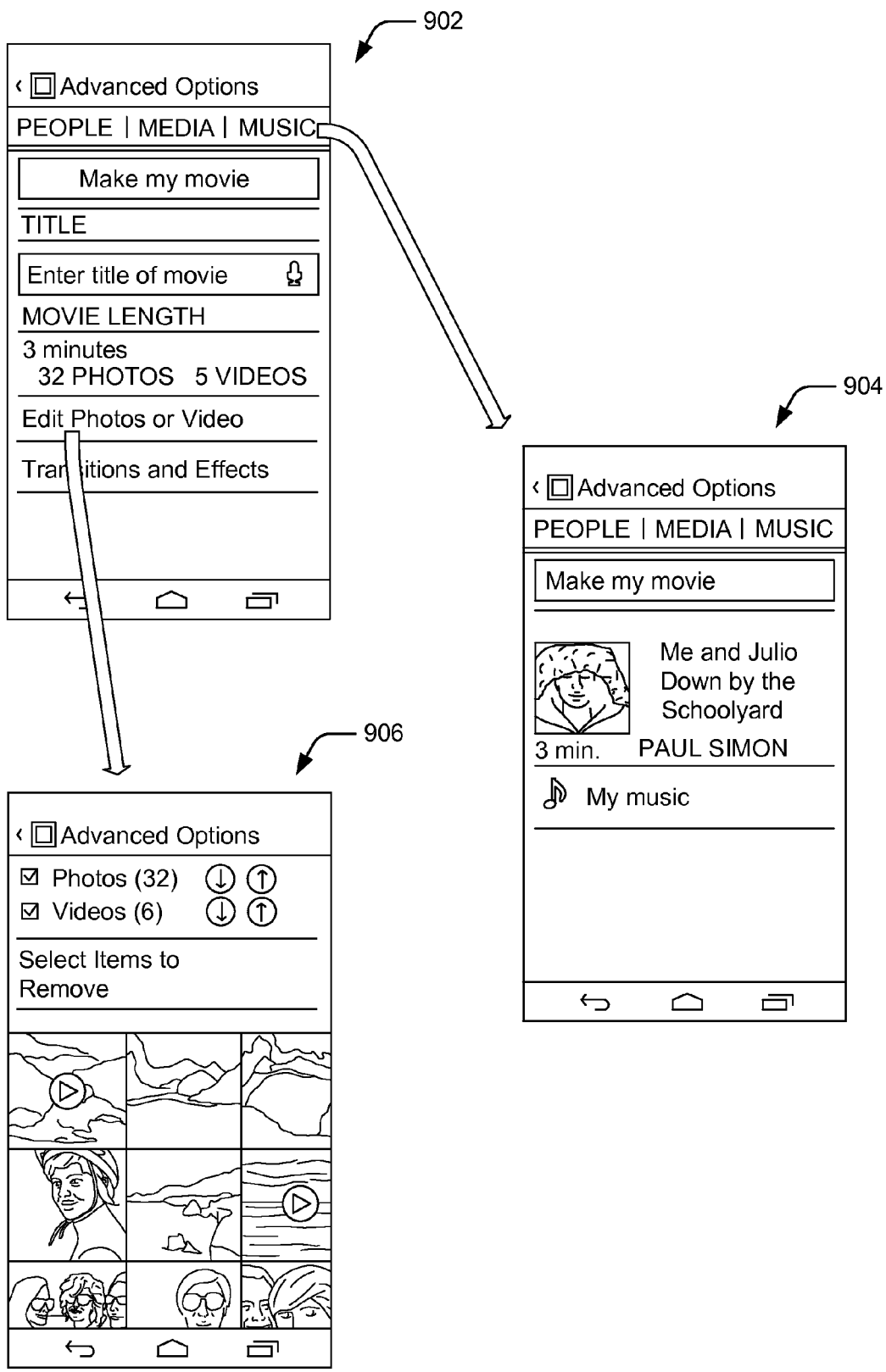
FIG. 9 illustrates example interfaces enabling selection of advanced options, music, and to remove or rearrange a reel preview's images and subclips.

The techniques enable various different manners in which to quickly and easily alter or customize the highlight reel responsive to reviewing the reel preview. In one such case, the user may select a guide view 806, through which to remove, shorten, or rearrange images and some clips in the highlight reel. The user may, for example, drag-and-drop images and subclips to rearrange the highlight reel through guide view 806. Other user interfaces are also shown, through which reel generator 112 enables users to alter a reel preview. For example, consider FIG. 9, which illustrates examples of operation 514 of FIG. 5, including advanced options interface 902, music selection interface 904, and removal and rearrange interface 906.

Advanced options interface 902 enables a user to select a title and length, as well as select additional interfaces through to select visual transitions and effects (not shown), edit photos or video, and select accompanying music. Music selection interface 904 enable selection of various types of accompanying audio, in this case a song by Paul Simon is selected having a similar length to that of the reel preview. Removal and rearrange interface 906 provides controls through which to increase or decrease a number of images (e.g., photos) or subclips, as well as remove images and subclips graphically.

Another advanced option is to alter weightings of persons, image attributes, or contexts. Consider, for example, FIG. 10, which illustrates person and context weighting interface 1002. Here four contexts and two persons' current weightings in the reel preview are presented. The interface enables a user to select, quickly and easily, to increase or decrease contexts and person weightings (e.g., outdoor scenes or to focus on one of the two persons shown).

By way of example consider a situation where a user selects to make significant numbers of alterations to a reel preview, including increasing the playtime, removing a subclip, rearranging the images, selecting accompanying audio, and increasing a weight of scenes showing the outdoors, and decreasing a weight of scenes to only one of the persons shown. Even with all of these changes, the techniques permit the user to do so quickly and easily. After these selections, methods 500 return to previously performed operations to create another, altered, reel preview. Reel generator 112 then presents the altered reel preview, which here we assume is approved.

At 516, methods 500 generate the final highlight reel. In some cases creating the final highlight reel encodes the subset of the images and video clips included within the final highlight reel and creates metadata for the final highlight reel. This metadata can be used to create a future highlight reel using this particular highlight reel as source media. On selection to finalize the highlight reel, and thus approve the reel preview, final approval interface 804 can be presented.

Operation 516 can generate the final highlight reel automatically and without further selection. Further at 518, methods 500 may proceed directly to share the highlight reel with the persons shown in the highlight reel or others determined to be interested in the highlight reel.

In some cases, operation 518 enables a user to select persons with which to share through a user interface having visual identifiers for persons. Selection is enabled through these visual identifiers or in other manners, such as a list of the person's names, pictures, a contact list having the same, and so forth.

Figure 11:
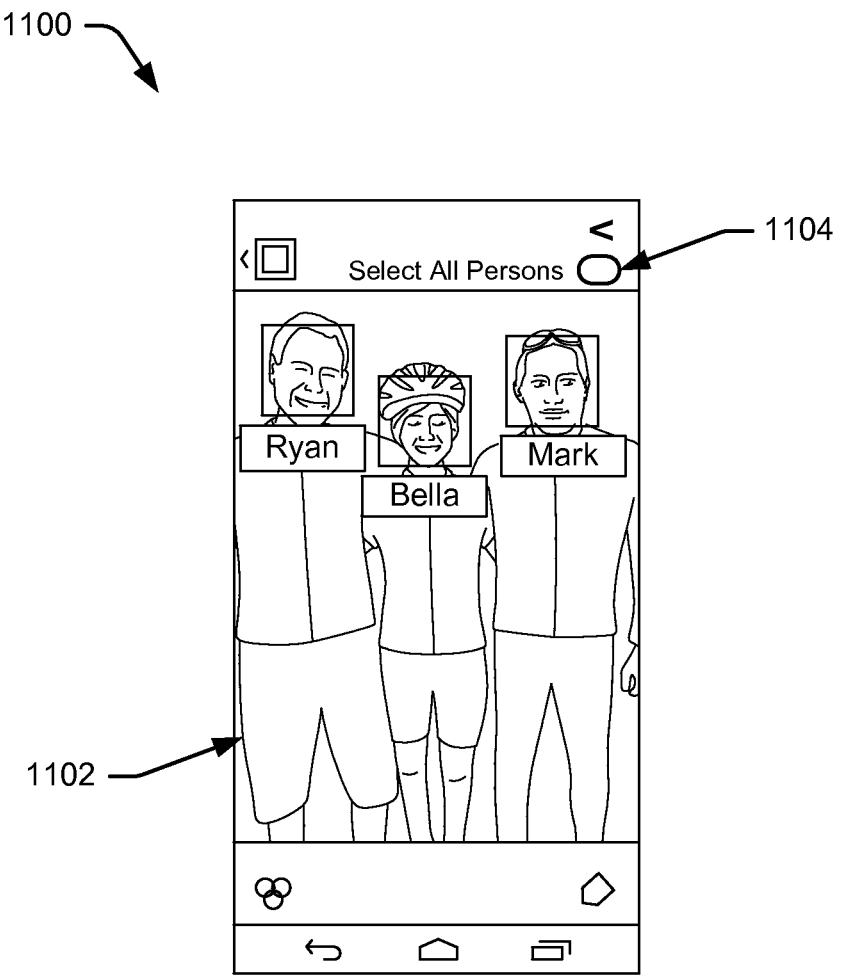
FIG. 11 illustrates an example interface that enables quick and easy selection of persons with which to share a highlight reel.

Consider FIG. 11, which illustrates an example interface 1100 enabling quick and easy selection of persons with which to share a highlight reel. For this example, assume that Bella goes on a bike tour with her friends Ryan and Mark through the wine country around Curico, Chile. Assume also that Bella takes photos and videos and selects, either before or after the tour, to create a highlight reel for her wine tour (e.g., by selecting an album of media covering this event). With the highlight reel complete, Bella wishes to share the highlight reel with her friends, Ryan and Mark.

The techniques can present these three people based on various criteria, such as showing photos from the highlight reel that show a largest number of images in which people are shown, either a largest total or a largest number of images in which faces are recognized. The techniques may also or instead show multiple photos (including still portions of a video) that the techniques determine include faces for persons, including allowing a user to quickly and easily move through the various photos to find those having the desired persons. In this example a photo 1102 (shown in line drawing) is presented that identifies three persons (Bella, Ryan, and Mark), their faces shown in blocks with accompanying names for each.

Interface 1100 enables immediate selection for all identified persons with a single gesture, such as a gesture circling all three faces or a tap on share-to-all control 1104. On selection reel generator 112 shares Bella's highlight reel with Ryan and Mark (and Bella, in some cases) in a default or previously selected manner.

In some cases, however, additional selections are enabled. These may include a determination that certain persons, which may or may not be in the highlight reel, are likely to be interested in the highlight reel. Consider a case, for example, where a highlight reel is created having a mom and one of her children. This created highlight reel can be determined to be of interest to the child's grandmother based on an explicit selection or history of sharing images, video clips, or highlight reels with the grandmother when the child is recognized. Similarly, by selection or determination, close friends may automatically be presented for selection (or de-selection) to be shared the highlight reel. For the ongoing example of Bella's highlight reel of her Curico wine tour, reel generator 112 may enable selection of Bella's best friend, Bella Nguyen, even though Bella did not go on the wine tour.

The sharing can be performed through various communication systems, including near-field-communication or personal-area-network communication from device-to-device (direct share), social media sharing (Facebook™), email (Gmail™), short-message service (SMS) or multimedia service (MMS) texting, and online server storage (Google Drive™).

Permission can be required to share the highlight reel. Permission can be received through a personal area network (PAN) or near-field communications, as well as various communication networks. Furthermore, permission can be received through explicit selection, such as when responding to an electronic invitation (e.g., a calendar acceptance or an Internet-based invitation in which an RSVP or similar is indicated), or implicitly by default for those that accept the invitation. Generally such a default selection is noted through an indicator or text in the calendar or Internet-based invitation. Other indications can be included, whether permission is explicitly indicated or by default, such noting such on photos and videos when taken or edited.

Concluding methods 500, reel generator 112 may determine media contexts and quality prior to a selection or determination to create a highlight reel. Operations 520 and 522 can be performed as part of methods 300 or 400, for example. In some cases, however, media quality and contexts are determined during methods 500, after receiving source media or selection to create a highlight reel.

Figure 12:
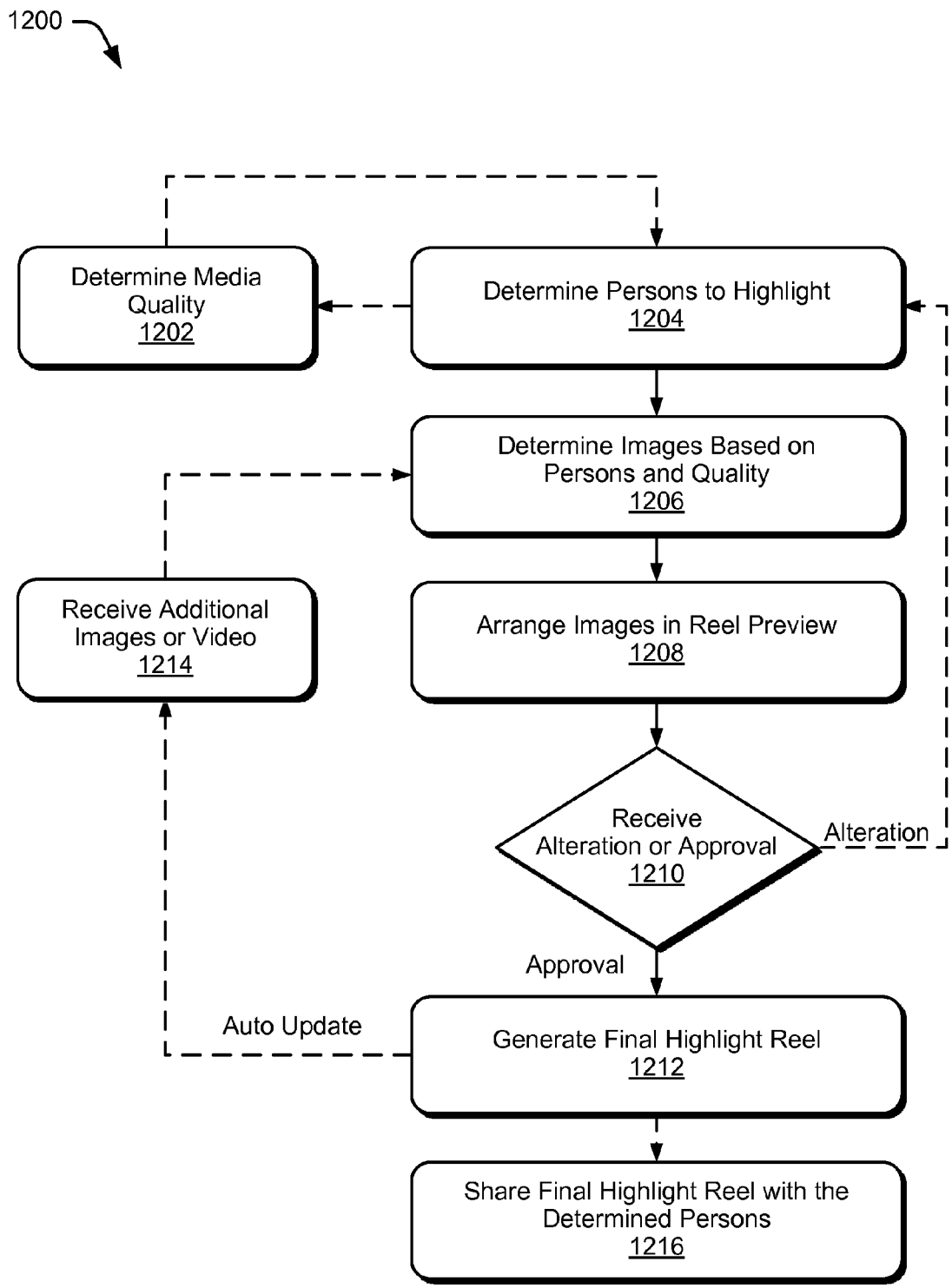
FIG. 12 illustrates example methods for creating a highlight reel based on quality metric values and persons shown in the media.

FIG. 12 illustrates example methods 1200 for creating a highlight reel based on quality metric values and persons shown in the media.

At 1202, media quality is determined for images and video clips. This may be performed as noted herein, such as methods 300 and 400. At 1204, persons to highlight in the highlight reel are determined. To determine which persons to highlight, reel generator 112 may perform facial recognition on the selected source media and then present these persons for additional selection by a user.

In some other cases, however, persons are selected prior to selection of source media. Selection can be received in various manners, such as text entry, contact list selection, social networking selection (e.g., to put on a person's social page or "wall"), group selection (e.g., the user's friends or persons associated with the highlight reel), a shared calendar event, and so forth. In such a case, reel generator 112 may present many persons known to the user from which the user may select to create a highlight reel. Determining persons to highlight, therefore, may be independent of the media currently available to reel generator 112. After selection of these persons, reel generator 112 proceeds to operation 1206.

At 1206, images are determined based on the persons and the quality metric values. As noted, this may be based on selected source media, or audiovisual media available or accessible by reel generator 112 on selection of persons to highlight. Reel generator 112 may analyze audiovisual media 114 of FIG. 1, for example, to determine source media 120 from audiovisual media 114 based on the persons recognized, such as those previously tagged or through facial recognition.

By way of example, assume that a user selects to create a highlight reel of herself at operation 1204. Reel generator 112 may then determine which media of audiovisual media 114 includes her face, treat this as source media 120, and then determine which of this source media 120 highlights her based on quality, total length of highlight reel, contextual variety, variety of other persons also in source media 120 (to show her with her various friends), and so forth. For example, reel generator 112 may rank images and clips by variety and quality, and then pull from the top of the ranked media in a greedy manner until a selected target duration is met. The duration can also be determined without selection based on the quality and variety or based on how much source media 120 was drawn from, e.g., some percentage of source media.

At 1208, the determined images and video clips are arranged into a reel preview. These determined images and video clips or subclips can be arranged for visual variety, e.g., contexts spread over the reel preview, or grouped by event or context, e.g., showing highlights of a concert and then of a vacation but not mixing the two. Further, the arrangement can spread subclips out from still images and so forth. As noted herein, these images and clips can be arranged and customized by a user quickly and easily if the user so desires. Examples of reel previews are shown in FIG. 8.

At 1210, alterations or approval are received. Example alterations and approvals are described herein, including at operations 514 in methods 500, and illustrated in FIGS. 8, 9, and 10. Methods 1200 proceed along an alteration path to repeat one or more operations if an alteration is received. If the reel preview is approved, methods 1200 proceed along an approval path to operation 1212.

At 1212, a final highlight reel is generated. This is also described in detail elsewhere herein. Methods 1200 may proceed to receive additional images or video clips at operation 1214 or to operation 1216. Thus, in some cases the techniques proceed to share the final highlight reel with the persons of highlighted at 1216. Alternatively or in addition however, methods 1200 may automatically update the final highlight reel. At 1214, additional images or video clips can be received automatically and without user interaction. On receiving, operations of methods 1210 can be performed again for these perceived additional images or video clips. For example, consider a case where Bella selects to create a highlight reel of herself. The final highlight reel can be generated but later updated as Bella takes additional pictures of herself or receives additional pictures from friends. By so doing, reel generator 112 may continually update a highlight reel.

In the context of methods 1200, consider an example case where reel generator 112 receives an indication from a calendar application that a user and two friends have a shared calendar event to go to a party. Reel generator 112, at operation 1204, determines to highlight these persons or receives a selection from these friends to do so. At some point, photos and video (source media 120) is received from these three friends that, based on times at which the media was captured by the three friends, can be determined to been taken during the party. Reel generator 112 can determine, or receive quality metric values, and based on these three friends and the determined quality of the media, arrange images from this shared media into a reel preview at operation 1208. Assume that one of the friends approves the generated reel preview or previously selected to have a final highlight reel created without approval, which is then shared with the three friends at operation 1216. In this example, the highlight reel is generated that highlights the party and the friends with little or no time and effort required of the friends.

In more detail, reel generator 112 may determine the images and video clips to balance how many times each friend is shown, provide images having all three friends in one photo (if possible), include higher-quality images, and show different kinds of images (e.g., in different lighting, with different other people, video clips with higher-quality audio, and so forth). Assume here that the total source media includes 15 minutes of video and 43 photos taken at the party and produces a highlight reel that is roughly one minute long, includes 12 of the 43 photos shown for two seconds each and 36 seconds of various parts of the 15 minutes of video. This highlight reel is thus quickly and easily enjoyed by the friends that went to (or while still at) the party and with very little time and effort.

Example Methods for Weighting People or Contexts

Figure 13:
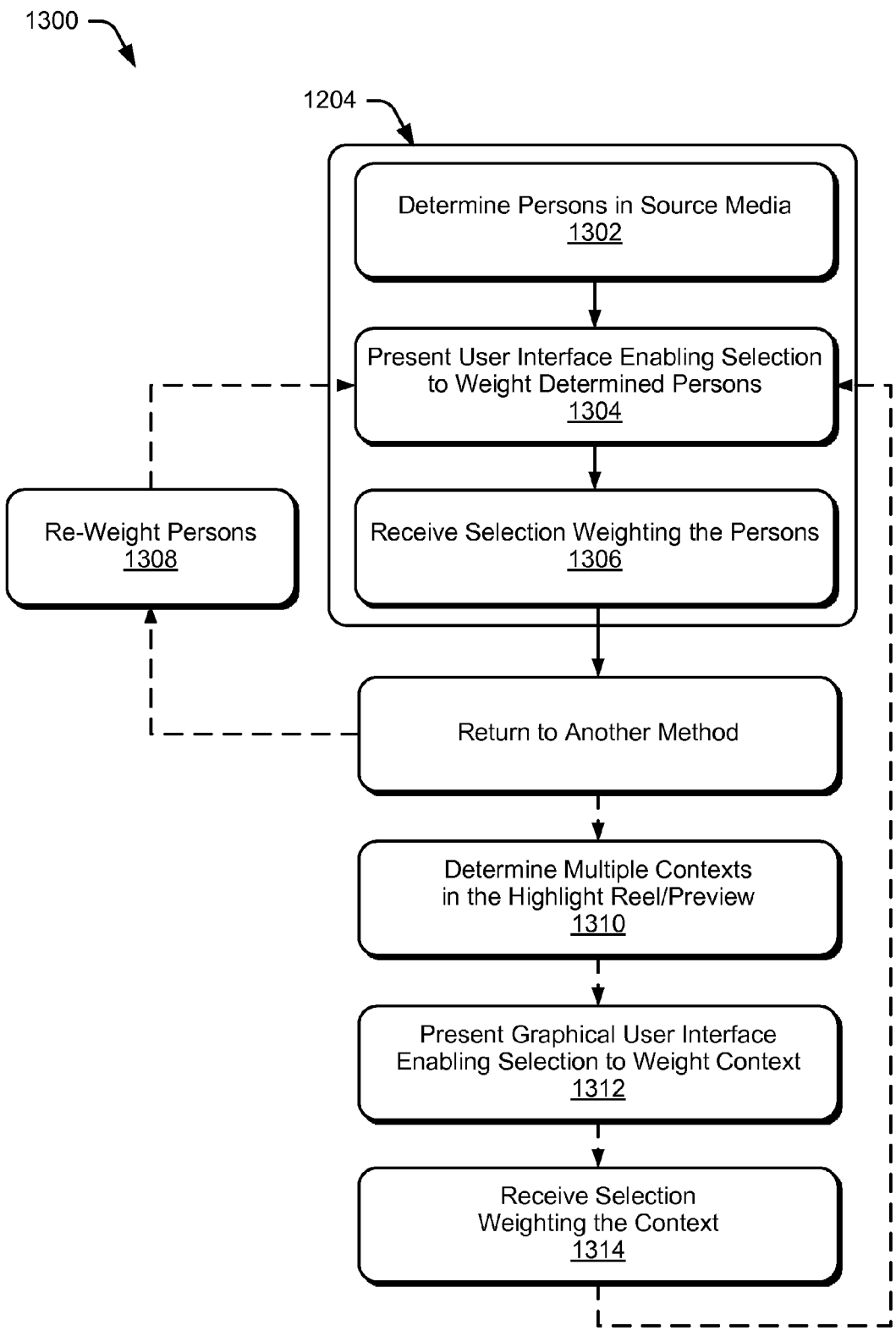
FIG. 13 illustrates example methods that enable weighting both persons and context as part of highlighting media.

As noted in methods 1200 above at operation 1204, the techniques may determine persons to highlight. In some cases persons are weighted in some manner. Consider methods 1300, illustrated in FIG. 13, which includes operations for weighting both persons and context as part of highlighting media.

Operations 1302, 1304, and 1306 are one manner in which operation 1204 of methods 1200 can be performed, though operation 1204 is not limited to operations of methods 1300.

At 1302, persons are determined to be in source media. This can be through various manners described herein, such as tagging, facial recognition, association with an event or other person in the media, and so forth.

At 1304, a user interface enabling selection to weight the persons determined to be in the source media is presented. This user interface can enable selection in various manners, such as presenting the determined persons and enabling textual or graphical selection.

Figure 14:
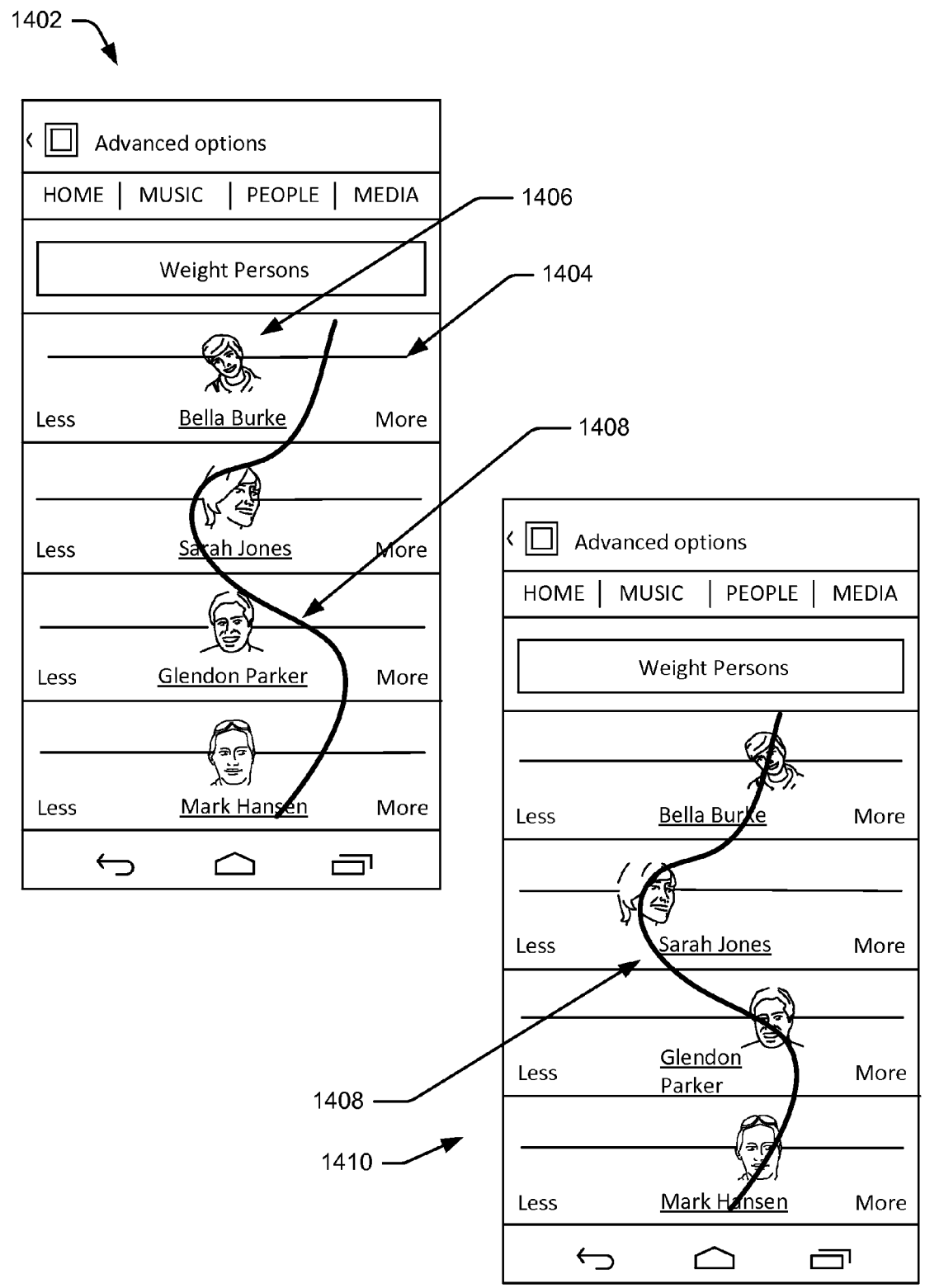
FIG. 14 illustrates an example interface enabling selection to weight persons through slider bars or gestures, the persons represented with thumbnail images.

By way of example, consider FIG. 14, which illustrates weighting interface 1402. In this example, selection to weight persons is enabled through slider bars 1404, each of the slider bars corresponding to a person. Example images 1406 of each person are movable on the slider bar to select the waiting for that person in the highlight reel. While shown in line drawing, these images 1406 for each person can be thumbnails showing each person's face pulled from source media (even the source media to be highlighted), avatars, or other identifiers.

Selection of multiple persons can be enabled through a single gesture as well. An example single gesture is shown traced over weighting interface 1402 at gesture trace 1408. Note that the current weightings of Bella Burke, Sarah Jones, Glendon Parker, and Mark Hansen are equal prior to selection. Responsive to receiving a single gesture, reel generator 112 adjusts the weightings based on that single gesture, show at post-selection weighting interface 1410. Here gesture trace 1408 is show again to show the increase in the weighting of Bella Burke and Glendon Parker, a large decrease in the weighting of Sarah Jones and a small increase in the weighting of Mark Hansen, all through this single gesture selection. Slider bars 1404 and gesture selection as illustrated by gesture trace 1408 are but two of many ways in which the techniques enable quick and easy selection to weight persons.

After persons and their weightings are received, the techniques may proceed to other methods, such as methods 1200 or 500 to perform other previously described operations. Thus, after weightings are received the techniques may select a subset of media for highlighting, arrange in a reel preview or highlight reel, present the preview or the highlight reel, and enable selection of alterations to the reel preview. After performing other operations, the techniques may reweight persons at operation 1308.

Assume, for example, that the techniques present a reel preview and enable selection to reweight the persons or to weight or reweight contexts though an interface for altering the reel preview as noted elsewhere herein. At 1308, the persons can be reweighted in the various manners described or illustrated, such as in FIGS. 10 and 14. They may also be reweighted as illustrated in FIGS. 15 and 16.

Figure 15:
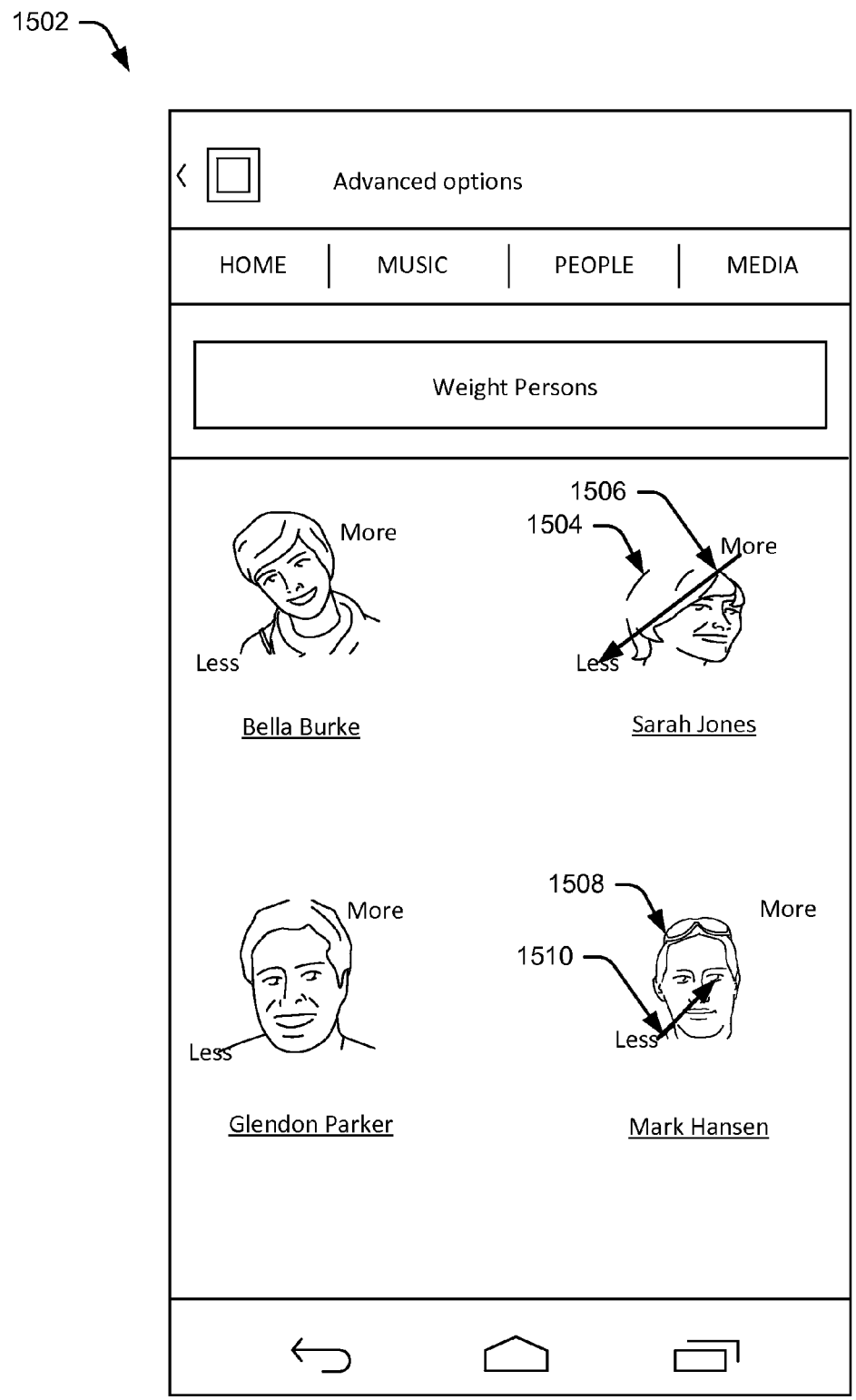
FIG. 15 illustrates an example interface that presents an image for each person in a highlight reel or reel preview where the image size corresponds to the person's weighting in the highlight reel or reel preview.
Figure 16:
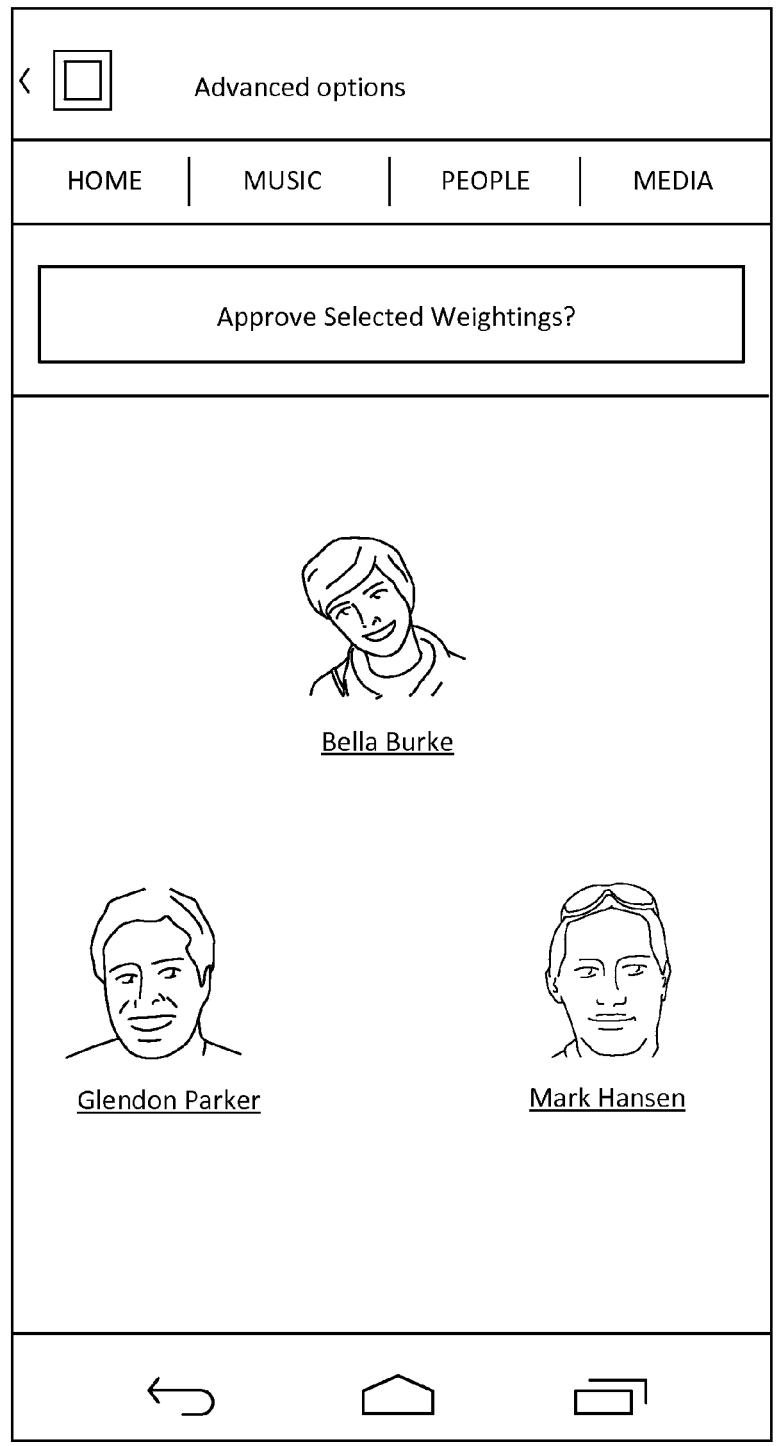
FIG. 16 illustrates the example interface of FIG. 15 but after selection to alter weightings of persons.

FIG. 15 illustrates a size-based weighting interface 1502, which presents an image for each of the persons in the highlight reel or preview, each of the images representing each person's face and having a size corresponding to the person's weighting in the highlight reel. Thus, current weightings (which correspond to weightings shown in FIG. 14 at post-selection weighting interface 1410), are shown based on sizes of images for each of Bella, Sarah, Glendon, and Mark. Size-based weighting interface 1502 enables selection to change weightings of these persons by altering their respective images. Thus, image 1504 for Sarah is shown with a gesture trace 1506 that completely removes Sarah to a weight of zero, shown with the gesture ending at a "Less" indicator. Image 1508 for Mark is shown with a gesture trace 1510 that increases Mark's weight but, based on an end point of the gesture trace (or a magnitude of the trace), indicates that Mark's weighting is to be increased by a relatively small amount rather than a maximum amount. The result of these selections are shown at post-reweighting interface 1602 of FIG. 16. Here Sarah is removed and Mark is increased to be about the same weighting as Bella and Glendon. Through this process a user weights and reweights her reel preview to result in a highlight reel that highlights three persons only and about equally.

In each of these manners of selecting a weighting (whether person or context) the techniques may adjust a visual representation of another person's weighting to compensate for the increase or decrease of another person's weight. Thus, in the case of Sarah being removed, reel generator 112 may increase the size of the images for the other persons, as removing one person necessarily increases a weight of something else (e.g., another of the persons). In some cases this is not desired, however, and so one person may be altered without a visual representation of how it affects the others being shown.

Returning to methods 1300, whether or not persons are reweighted at operation 1308, in some optional cases methods 1300 proceed to operations 1310, 1312, and 1314.

At 1310, weightings of contexts in the highlight reel or the reel preview are determined. Contextual weightings can be determined as noted elsewhere herein.

Figure 10:
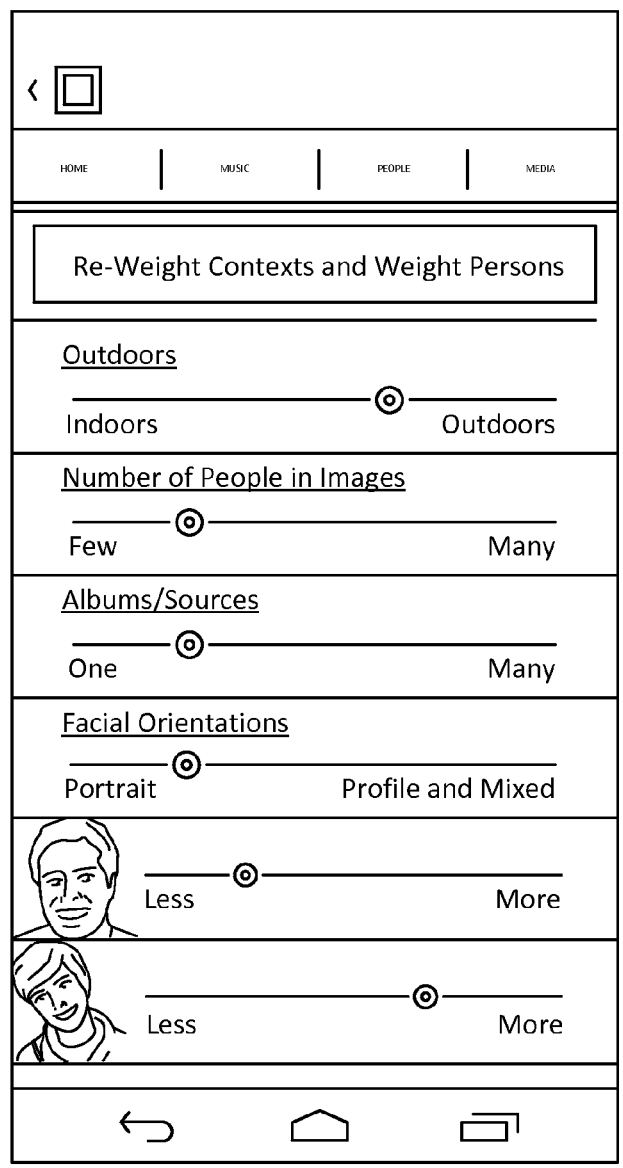
FIG. 10 illustrates an interface presenting and enabling alteration of weightings of persons and contexts through use of slider bars.

At 1312, one or more of the weightings of the contexts are presented, and selection is enabled, in an interface. This can be performed as shown in FIG. 10, or in a manner similar to FIGS. 14, 15, and 16 but for contexts rather than, or in addition to, persons. Thus a slider or size having an image of a sun and trees can be used to enable selection to alter weightings for outdoor scenes and so forth.

At 1314, responsive to receiving selection to alter the one or more weightings, the highlight reel or the reel preview is altered based on the alteration to weighting the contexts. Continuing the current example, assume that Bella is presented with a high weighting of action and outdoor scenes base on her wine tour album having mostly these sorts of images and video clips. She can select to alter these weightings—assume here that when she watched the preview she didn't like the few indoor images and clips in the reel preview as they weren't what she was looking to highlight. She can simply reduce the weight of the indoor scenes, even to zero, or increase to maximum outdoor and action scenes for a same result.

As noted methods 1300 may work in conjunction with other methods herein. For brevity these other operations, such as generating a highlight reel and sharing the reel, are not repeated here.

Example Device

Figure 17:
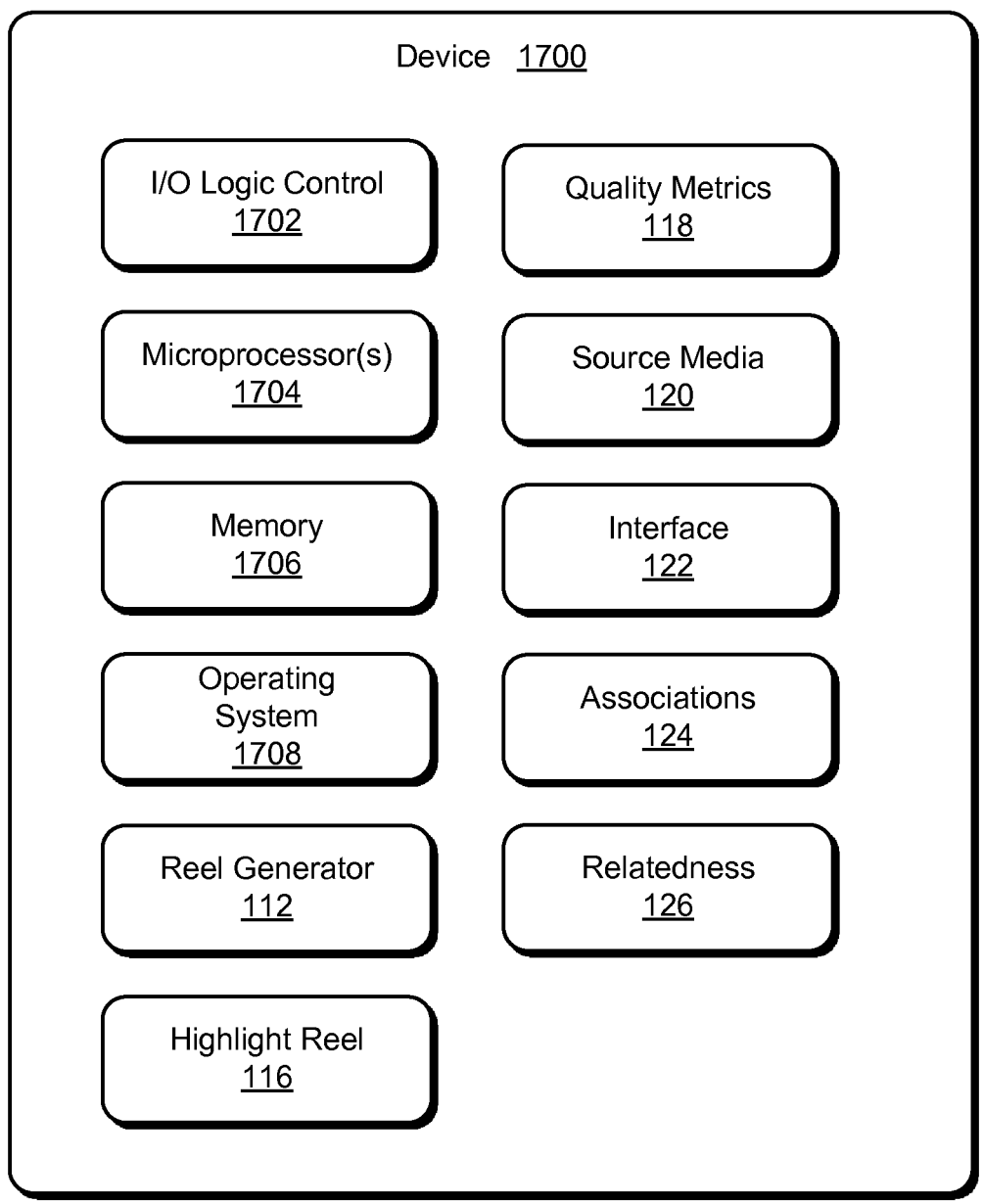
FIG. 17 illustrates various components of an example apparatus that can implement techniques for grading images and video clips.

FIG. 17 illustrates various components of an example device 1700 including reel generator 112 as well as including or having access to other components of FIGS. 1 and 2. These components can implemented in hardware, firmware, and/or software and as described with reference to any of the previous FIGS. 1-16.

Example device 1700 can be implemented in a fixed or mobile device being one or a combination of a media device, desktop computing device, television set-top box, video processing and/or rendering device, appliance device (e.g., a closed-and-sealed computing resource, such as some digital video recorders or global-positioning-satellite devices), gaming device, electronic device, vehicle, workstation, laptop computer, tablet computer, smartphone, video camera, camera, computing watch, computing ring, computing spectacles, and netbook.

Example device 1700 can be integrated with electronic circuitry, a microprocessor, memory, input-output (I/O) logic control, communication interfaces and components, other hardware, firmware, and/or software needed to run an entire device. Example device 1700 can also include an integrated data bus (not shown) that couples the various components of the computing device for data communication between the components.

Example device 1700 includes various components such as an input-output (I/O) logic control 1702 (e.g., to include electronic circuitry) and microprocessor(s) 1704 (e.g., microcontroller or digital signal processor). Example device 1700 also includes a memory 1706, which can be any type of random access memory (RAM), a low-latency nonvolatile memory (e.g., flash memory), read only memory (ROM), and/or other suitable electronic data storage. Memory 1706 includes or has access to reel generator 112, highlight reel 116, quality metrics 118, source media 120, interface 122, associations 124, and relatedness 126. Reel generator 112 is capable of performing one more actions described for the techniques. Other modules may also be included, such as a face-recognition engine (not shown), calendar application, event planning application, email application, and so forth.

Example device 1700 can also include various firmware and/or software, such as an operating system 1708, which, along with other components, can be computer-executable instructions maintained by memory 1706 and executed by microprocessor 1704. Example device 1700 can also include other various communication interfaces and components, wireless LAN (WLAN) or wireless PAN (WPAN) components, other hardware, firmware, and/or software.

Other examples capabilities and functions of these entities are described with reference to descriptions and figures above. These entities, either independently or in combination with other modules or entities, can be implemented as computer-executable instructions maintained by memory 1706 and executed by microprocessor 1704 to implement various embodiments and/or features described herein.

Alternatively or additionally, any or all of these components can be implemented as hardware, firmware, fixed logic circuitry, or any combination thereof that is implemented in connection with the I/O logic control 1702 and/or other signal processing and control circuits of example device 1700. Furthermore, some of these components may act separate from device 1700, such as when remote (e.g., cloud-based) services perform one or more operations for reel generator 112. For example, photo and video (source, accessible, or in the highlight reel) are not required to all be in one location, some may be on a user's smartphone, some on a server, some downloaded to another device (e.g., a laptop or desktop). Further, some images may be taken by a device, indexed, and then stored remotely, such as to save memory resources on the device.

CONCLUSION

Although grading images and video clips have been described in language specific to structural features and/or methodological acts, the appended claims is not necessarily limited to the specific features or acts described. Rather, the specific features and acts are disclosed as example forms of implementing techniques and apparatuses for grading images and video clips.

What is claimed is:

1. A method comprising:
 receiving an image;
 grading the image based on two or more quality metrics, the two or more quality metrics including:
  one or more of: a brightness, a color variance, or an overall sharpness; and
  one or more of: an accumulated-faces area, a head orientation, a face or faces smiling, eye blinks, locations of one or more faces, an eye focal point, an aspect ratio, a uniqueness, a mistake, or a face blur;
 generating quality metric values for each quality metric;
 storing the quality metric values associated with the image; and
 using the quality metric values to generate a subset of graded images from a set of images that includes the image and other images, the other images having been graded based on the one or more quality metrics, the subset highlighting the set of the image and the other images.

2. The method as recited in claim 1, wherein the quality metrics used to grade the image include an independent metric that is independent of values for other instances of the independent metric associated with the other images.

3. The method as recited in claim 1, wherein the quality metrics used to grade the image include a relative metric, a quality metric value for the relative metric being based at least in part on other quality metric values for the relative metric associated with the other images.

4. The method as recited in claim 1, wherein the image is a frame of a video clip.

5. The method as recited in claim 1, wherein each of the quality metric values for the image is represented using a floating point value.

6. The method as recited in claim 1, wherein the image is captured by a mobile device and the grading is immediately responsive to the capture, or to two or more of: the capture; determination that the mobile device is drawing power from a non-battery power source; or determination that the mobile device is currently using low quantities of processing and memory resources.

7. The method as recited in claim 1, wherein the image is received from a mobile device over a communication network by a remote device and the grading is performed by the remote device.

8. The method as recited in claim 1, further comprising determining a contextual variety of the image and the other images, the contextual variety including one or more of an indoor scene, an outdoor scene, a nighttime scene, a daytime scene, or an association with particular events.

9. The method as recited in claim 8, further comprising receiving user input to weight the contextual variety of the image and the other images.

10. The method as recited in claim 9, further comprising determining associations for the image, the associations indicating an association with a person, a number of persons, a context, or an event, and wherein determining the subset is further based on the associations.

11. A computing device comprising:
 a display;
 a processor; and a non-transitory computer-readable storage media device embodying computer-executable instructions that, when executed by the processor, perform operations comprising:
receiving an image;
grading the image based on two or more quality metrics, the two or more quality metrics including:
one or more of: a brightness, a color variance, or an overall sharpness; and
one or more of: an accumulated-faces area, a head orientation, a face or faces smiling, eye blinks, locations of one or more faces, an eye focal point, an aspect ratio, a uniqueness, a mistake, or a face blur;
generating quality metric values for each quality metric;
storing the quality metric values associated with the image; and
using the quality metric values to generate a subset of graded images from a set of images that includes the image and other images, the other images having been graded based on the one or more quality metrics, the subset highlighting the set of the image and the other images.

12. The computing device of claim 11, further comprising presenting the subset of graded images on the display, the subset of graded images presented within a highlight reel.

13. The computing device of claim 11, wherein the quality metrics used to grade the image include an independent metric that is independent of values for other instances of the independent metric associated with the other images.

14. The computing device of claim 11, wherein the quality metrics used to grade the image include a relative metric, a quality metric value for the relative metric being based at least in part on other quality metric values for the relative metric associated with the other images.

15. The computing device of claim 11, wherein the image is a frame of a video clip.

16. The computing device of claim 11, wherein each of the quality metric values for the image is represented using a floating point value.

17. The computing device of claim 11, wherein the computing device is a mobile device, the image is captured by the mobile device, and the grading is:
immediately responsive to the capture; or
responsive to the capture and one of: a determination that the mobile device is drawing power from a non-battery power source or a determination that the mobile device is currently using low quantities of processing and memory resources.

18. The computing device of claim 11, wherein the image is received from a mobile device over a communication network by a remote device and the grading is performed by the remote device.

19. The computing device of claim 11, further comprising determining a contextual variety of the image and the other images, the contextual variety including one or more of an indoor scene, an outdoor scene, a nighttime scene, a daytime scene, or an association with particular events.

20. The computing device of claim 19, further comprising receiving user input to weight the contextual variety of the image and the other images, the weight affecting the subset generated from the set of images.

* * * * *